United States Patent
Hormuth et al.

(10) Patent No.: US 10,102,170 B2
(45) Date of Patent: Oct. 16, 2018

(54) SYSTEM AND METHOD FOR PROVIDING INPUT/OUTPUT FUNCTIONALITY BY AN I/O COMPLEX SWITCH

(71) Applicant: Dell Products, LP, Round Rock, TX (US)

(72) Inventors: Robert W. Hormuth, Cedar Park, TX (US); Robert L. Winter, Burnet, TX (US); Shawn J. Dube, Austin, TX (US); Bradley J. Booth, Austin, TX (US); Geng Lin, Cupertino, CA (US); Jimmy Pike, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 1080 days.

(21) Appl. No.: 13/897,055

(22) Filed: May 17, 2013

(65) Prior Publication Data

US 2013/0325998 A1    Dec. 5, 2013

Related U.S. Application Data

(60) Provisional application No. 61/649,064, filed on May 18, 2012.

(51) Int. Cl.
| | |
|---|---|
| *G06F 15/167* | (2006.01) |
| *G06F 13/40* | (2006.01) |
| *G06F 15/173* | (2006.01) |
| *G06F 1/04* | (2006.01) |
| *G06F 9/4401* | (2018.01) |

(Continued)

(52) U.S. Cl.
CPC ............ *G06F 13/4027* (2013.01); *G06F 1/04* (2013.01); *G06F 9/4401* (2013.01); *G06F 13/00* (2013.01); *G06F 13/28* (2013.01); *G06F 13/40* (2013.01); *G06F 13/4022* (2013.01); *G06F 15/17331* (2013.01); *G06F 21/572* (2013.01); *H04L 41/06* (2013.01); *H04L 49/00* (2013.01); *H04L 41/0213* (2013.01); *Y02B 60/1228* (2013.01);

(Continued)

(58) Field of Classification Search
CPC ............... H04L 49/30; H04L 12/40123; H04L 67/2861; H04L 69/00; G06F 3/0227; G06F 11/2002; G06F 11/3041
USPC ......................................................... 709/212
See application file for complete search history.

(56) References Cited

U.S. PATENT DOCUMENTS

| | | | | |
|---|---|---|---|---|
| 6,836,813 B1 * | 12/2004 | Gulick | ............... | G06F 13/4022 710/306 |
| 7,099,969 B2 * | 8/2006 | McAfee | .............. | G06F 13/4022 710/107 |

(Continued)

OTHER PUBLICATIONS

System Clock, 2003, www.thefreedictionary.com.

*Primary Examiner* — SM Rahman
(74) *Attorney, Agent, or Firm* — Larson Newman, LLP

(57) ABSTRACT

An input/output (I/O) device includes a management controller interface, a plurality of network switching interfaces, a storage interface, a component controller interface, and a plurality of multifunction modules. The multifunction modules further include a processing node interface, a first endpoint coupled to the management controller interface, a second endpoint coupled to one of the plurality of network switching interfaces, a third endpoint coupled to a remote direct memory access (RDMA) block, a fourth endpoint coupled to the storage interface, and a fifth endpoint coupled to the component controller interface.

18 Claims, 18 Drawing Sheets

(51) Int. Cl.
*H04L 12/931* (2013.01)
*G06F 13/28* (2006.01)
*G06F 21/57* (2013.01)
*G06F 13/00* (2006.01)
*H04L 12/24* (2006.01)

(52) U.S. Cl.
CPC ........... *Y02B 60/1235* (2013.01); *Y02D 10/14* (2018.01); *Y02D 10/151* (2018.01)

(56) References Cited

U.S. PATENT DOCUMENTS

| | | | |
|---|---|---|---|
| 8,583,773 B2 | 11/2013 | Pafumi et al. | |
| 2001/0013121 A1 | 8/2001 | Kimball et al. | |
| 2003/0105904 A1 | 6/2003 | Abbondanzio et al. | |
| 2003/0208648 A1 | 11/2003 | Linares et al. | |
| 2011/0173480 A1 | 7/2011 | Bloomfield et al. | |
| 2011/0302343 A1* | 12/2011 | Butcher | G06F 9/4401 710/107 |
| 2012/0278655 A1 | 11/2012 | Lin et al. | |
| 2012/0284494 A1* | 11/2012 | Funk | G06F 9/4401 713/2 |
| 2013/0132643 A1* | 5/2013 | Huang | G06F 13/4022 711/103 |
| 2013/0268694 A1* | 10/2013 | Campbell | G06F 13/20 710/8 |

\* cited by examiner

SYSTEM AND METHOD FOR PROVIDING INPUT/OUTPUT FUNCTIONALITY BY AN I/O COMPLEX SWITCH

CROSS-REFERENCE TO RELATED APPLICATION(S)

This application claims priority to U.S. Provisional Patent Application No. 61/649,064, entitled "System and Method for Providing a Processing Node with Input/Output Functionality Provided by an I/O Complex Switch," filed on May 18, 2012, which is assigned to the current assignee hereof and is incorporated herein by reference in its entirety.

FIELD OF THE DISCLOSURE

The present disclosure generally relates to information handling systems, and more particularly relates to a processing node with input/output functionality provided by an input/output complex switch.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
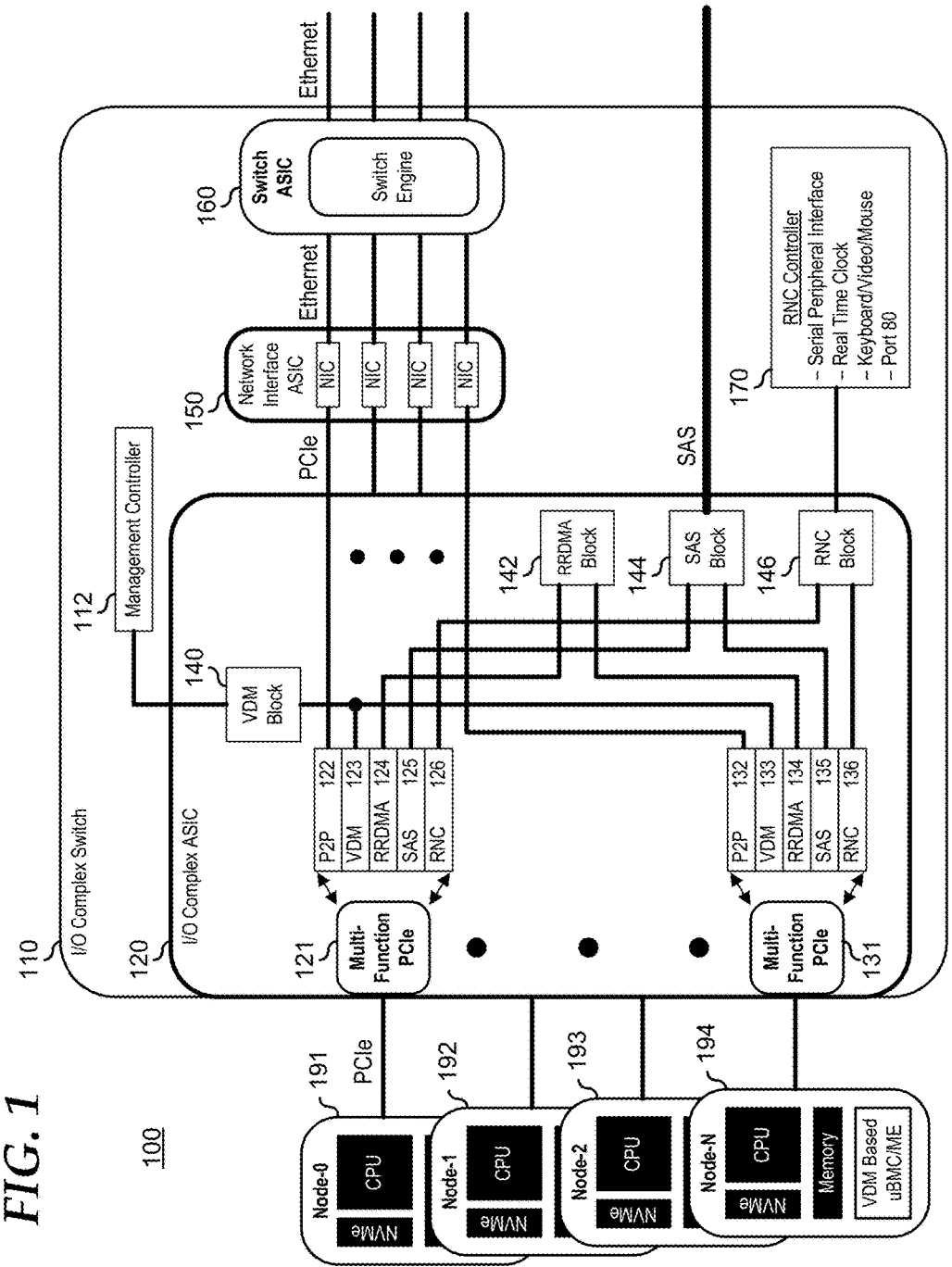
FIG. 1 is a block diagram illustrating a processing system according to an embodiment of the present disclosure.

FIG. 1 illustrates a processing system 100 that can include one or more information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (input/output) devices, such as a keyboard, a mouse, and a video display. The information handling system may also include one or more buses operable to transmit communications between the various hardware components.

In a particular embodiment, processing system 100 includes an input/output (input/output) complex switch 110 and processing nodes 191-194, and represents a highly scalable networked data processing system. For example, processing system 100 can include a rack mounted server system, where input/output complex switch 110 represents a rack mounted switch and processing nodes 190 represent one or more rack or chassis mounted servers, blades, processing nodes, or a combination thereof. Input/output complex switch 110 includes a management controller 112, an input/output complex application specific integrated circuit (ASIC) 120, a network interface ASIC 150, a switch ASIC 160, and a remote node component (RNC) controller 170. Input/output complex ASIC 120 includes a multi-function Peripheral Component Interconnect-Express (PCIe) module 121, one or more additional multi-function PCIe modules 131, a vendor defined messaging (VDM) block 140, a rack-level remote direct memory access (RRDMA) block 142, a serial attach small computer system interface (SAS) block 144, and an RNC block 146. Multi-function PCIe module 121 includes a PCIe-to-PCIe (P2P) bridge endpoint 122, a VDM endpoint 123, an RRDMA endpoint 124, an SAS endpoint 125, and an RNC endpoint 126. Similarly, multi-function PCIe module 131 includes a P2P bridge endpoint 132, a VDM endpoint 133, an RRDMA endpoint 134, an SAS endpoint 135, and an RNC endpoint 136.

Multi-function PCIe module 121 is connected to processing node 191 via a PCIe link. For example, multi-function PCIe module 121 can be connected to processing node 191 via a ×1 PCIe link, a ×2 PCIe link, a ×4 PCIe link, a ×8 PCIe link, or a ×16 PCIe link, as needed or desired. Further, multi-function PCIe module 121 can be connected to processing node 191 via a backplane of a chassis that includes input/output complex switch 110 and processing nodes 191-194, the multi-function PCIe module can be connected to the processing node via an external PCIe cable, or the multi-function PCIe module can be connected to the processing node via a PCIe connector on either input/output complex switch 110, the processing node, another board that connects the multi-function PCIe module to the processing node, or a combination thereof. Multi-function PCIe module 121 operates as a PCIe endpoint associated with processing node 191. As such, multi-function PCIe module 121 is enumerated in the PCIe configuration space of processing node 191 as being associated with a particular PCIe link number and a designated device number on the PCIe link. Further, multi-function PCIe module 121 is enumerated in the PCIe configuration space as being associated with a particular function number of the device. For example, multi-function PCIe module 121 can be identified as function 0. Multi-function PCIe module 121 includes a set of PCIe endpoint status and control registers that permit processing node 191 to send data to, to receive data from, and to otherwise control the operation of the multi-function PCIe module.

Multi-function PCIe module 131 is similar to multi-function PCIe module 121, and is connected to processing node 194 via a PCIe link, such as a ×1 PCIe link, a ×2 PCIe link, a ×4 PCIe link, a ×8 PCIe link, or a ×16 PCIe link. Multi-function PCIe module 131 can be connected to processing node 194 via a backplane, an external PCIe cable, or a PCIe connector, and can be connected in the same way that multi-function PCIe module 121 is connected to processing node 191, or can be connected differently. Multi-function PCIe module 131 operates as a PCIe endpoint associated with processing node 194, and is enumerated in the PCIe configuration space of the processing node as being associated with a particular PCIe link number and a designated device number on the PCIe link. Further, multi-function PCIe module 131 is enumerated in the PCIe configuration space as being associated with a particular function number of the device, and includes a set of PCIe endpoint status and control registers that permit processing node 194 to send data to, to receive data from, and to otherwise control the operation of the multi-function PCIe module. Input/output complex ASIC 120 can include one or more additional multi-function PCIe modules that are similar to multi-function PCIe modules 121 and 131, and that are connected to one or more additional processing nodes such to processing nodes 192 and 193. For example, input/output complex ASIC 120 can include up to 16 multi-function PCIe modules similar to multi-function PCIe modules 121 and 131 that can be coupled to up to 16 processing nodes similar to processing nodes 191-194. In this example, network interface ASIC 150 can include 16 network interface ports. In another example, input/output complex ASIC 120 can include more or less than 16 multi-function PCIe modules, and network interface ASIC 150 can include more or less than 16 network interface ports. In another embodiment, input/output complex switch 110 can include two or more input/output complex ASICs similar to input/output complex ASIC 120. For example, input/output complex switch 110 can include four input/output complex ASICs 120 such that up to 64 processing nodes 191-194 can be coupled to the input/output switch complex. In this example, network interface ASIC 150 can include 64 network interface ports, and each input/output complex ASIC 120 can be connected to 16 of the network interface ports.

Multi-function PCIe modules 121 and 131 operate as multi-function PCIe devices in accordance with the PCI Express 3.0 Base Specification. As such, multi-function PCIe module 121 includes P2P endpoint 122, VDM endpoint 123, RRDMA endpoint 124, SAS endpoint 125, and RNC endpoint 126 that each operate as PCIe endpoints associated with processing node 191, and are enumerated in the PCIe configuration space of the processing node as being associated with the same PCIe link number and designated device number as multi-function PCIe module 121, but with different function numbers. For example, P2P endpoint 122 can be identified as function 1, VDM endpoint 123 can be identified as function 2, RRDMA endpoint 124 can be identified as function 3, SAS endpoint 125 can be identified as function 4, and RNC endpoint 126 can be identified as function 5. Similarly, multi-function PCIe module 131 includes P2P endpoint 132, VDM endpoint 133, RRDMA endpoint 134, SAS endpoint 135, and RNC endpoint 136 that each operate as PCIe endpoints associated with processing node 194, and are enumerated in the PCIe configuration space of the processing node as being associated with the same PCIe link number and designated device number as multi-function PCIe module 131, but with different function numbers. For example, P2P endpoint 132 can be identified as function 1, VDM endpoint 133 can be identified as function 2, RRDMA endpoint 134 can be identified as function 3, SAS endpoint 135 can be identified as function 4, and RNC endpoint 136 can be identified as function 5. Each endpoint 122-126 and 132-136 includes a set of PCIe endpoint status and control registers that permit the respective processing nodes 191 and 194 to send data to, to receive data from, and to otherwise control the operation of the endpoints.

Figure 2:
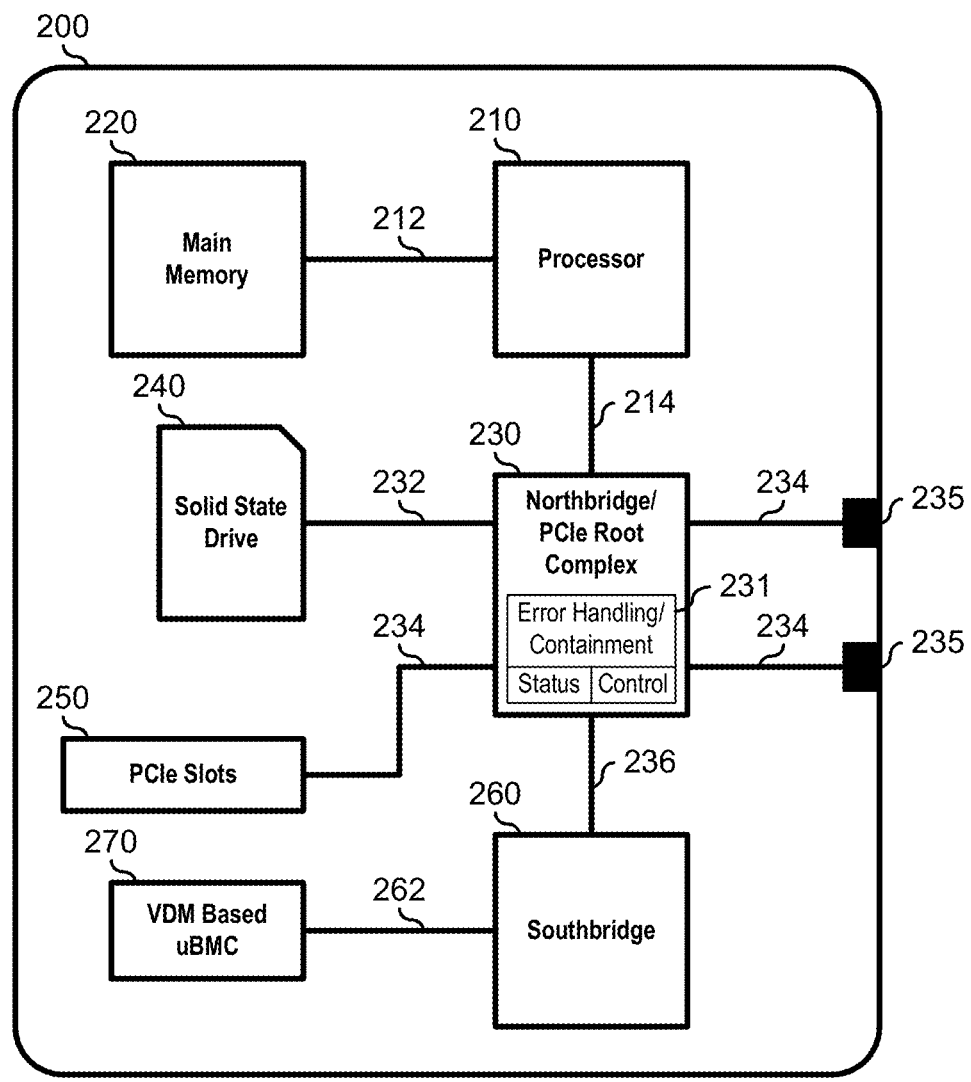
FIG. 2 is a block diagram illustrating a processing node according to an embodiment of the present disclosure.

FIG. 2 illustrates a processing node 200 similar to processing nodes 191-194, including one or more processors 210, a main memory 220, a northbridge 230, a solid state drive (SSD) 240, one or more PCIe slots 250, a southbridge 260, and micro-baseboard management controller (uBMC) 270. Processor 210 is connected to main memory 220 via a memory interface 212. In a particular embodiment, main memory 220 represents one or more double data rate type 3 (DDR3) dual in-line memory modules (DIMMs), and memory interface 212 represents a DDR3 interface. Processor 210 is connected to northbridge 230 via a processor main interface 214. In a particular embodiment, processor 210 represents an Intel processor such as a Core i7 or Xeon processor, northbridge 230 represents a compatible chipset northbridge such as an Intel X58 chip, and processor main interface 214 represents a QuickPath Interconnect (QPI) interface. In another embodiment, processor 210 represents an Advanced Micro Devices (AMD) accelerated processing unit (APU), northbridge 230 represents a compatible chipset northbridge such as an AMD FX990 chip, and processor main interface 214 represents a HyperTransport interface.

Northbridge 230 operates as a PCIe root complex, and includes multiple PCIe interfaces including a Non-Volatile Memory Express (NVMe) interface 232 and one or more PCIe interfaces 234 that are provided to PCIe connectors 235 and to PCIe slots 250. For example, NVMe interface 232 and PCIe interfaces 234 can represent ×1 PCIe links, ×2 PCIe links, ×4 PCIe links, ×8 PCIe links, or ×16 PCIe links, as needed or desired. NVMe interface 232 connects the northbridge to SSD 240, and operates in conformance with the Non-Volatile Memory Host Controller Interface (NVM-HCI) Specification. PCIe connectors 235 can be utilized to connect processing node 200 to one or more input/output complex switches such as input/output switch complex 110. PCIe slot 250 provides processing node 200 with flexibility to include various types of expansion cards, as needed or desired.

Northbridge 230 includes error handling and containment logic 231. Error handling and containment logic 231 executes error handling routines that describe the results of input/output transactions issued on NVMe interface 232 and PCIe interfaces 234. Error handling and containment logic 231 includes status and control registers. The status registers include indications related to read transaction completion and indications related to write transaction completion. The error handling routines provide for input/output errors to be handled within northbridge 230 without stalling processor 210, or crashing an operating system (OS) or virtual machine manager (VMM) operating on processing node 200.

Read completion status error routines return information about the status of read transactions. If an error results from a read transaction, the routine indicates the type of error, the cause of the error, or both. For example, a read transaction error can include a timeout error, a target abort error, a link down error, another type of read transaction error, or a combination thereof. The read completion status error routines also provide the address associated with the read transaction that produced the error. If a read transaction proceeds normally, the read completion status routines return information indicating that the read transaction was successful, and provide the address associated with the read transaction.

Write completion status error routines return information about the status of write transactions. If an error results from a write transaction, the routine indicates the type of error, the cause of the error, or both. For example, a write transaction error can include a timeout error, a target abort error, a link down error, another type of write transaction error, or a combination thereof. The write completion status error routines also provide the address associated with the write transaction that produced the error. If a write transaction proceeds normally, the write completion status routines return information indicating that the write transaction was successful, and provide the address associated with the write transaction.

The control registers operate to enable the functionality of the error handling routines, including enabling read error handling and write error handling, and enabling system interrupts to be generated in response to read errors and write errors. Device drivers associated with the transactions handled by northbridge 230 utilize the error handling routines to capture the failed transactions, to interrupt the device driver, and to prevent the user program from consuming faulty data. In a particular embodiment, the device drivers check for errors in the transactions by calling the appropriate error handling routine or reading the appropriate status register. In another embodiment, the device drivers enable interrupts to handle errors generated by the transactions. For example, if an error occurs in a read transaction, a device driver can retry the read transaction on the same link or on a redundant link, can inform the OS or application that a read error occurred before the OS or application consume the faulty data, or a combination thereof. Similarly, if an error occurs in a write transaction, a device driver can retry the write transaction on the same link or on a redundant link, can inform the OS or application that a write error occurred, or a combination thereof.

Northbridge 230 is connected to southbridge 260 via a chipset interface 236. In the embodiment where processor 210 represents an Intel processor and northbridge 230 represents a compatible chipset northbridge, southbridge 260 represents a compatible southbridge such as an Intel input/output controller hub (ICH), and chipset interface 236 represents a Direct Media Interface (DMI). In the embodiment where processor 210 represents an AMD APU and northbridge 230 represents a compatible chipset northbridge, southbridge 260 represents a compatible southbridge such as an AMD SB950, and chipset interface 236 represents an A-Link Express interface. uBMC 270 is connected to southbridge 260 via a southbridge interface 262. In a particular embodiment, uBMC 270 is connected to southbridge 260 via a low pin count (LPC) bus, an inter-integrated circuit (I2C) bus, or another southbridge interface, as needed or desired. uBMC 270 operates to provide an interface between a management controller such as management controller 112 and various components of processing node 200 to provide out-of-band server management for the processing node. For example, uBMC 270 can be connected to a power supply, one or more thermal sensors, one or more voltage sensors, a hardware monitor, main memory 220, northbridge 230, southbridge 260, another component of processing node 200, or a combination thereof. As such, uBMC 270 can represent an integrated Dell Remote Access Controller (iDRAC), an embedded BMC, or another out-of-band management controller, as needed or desired.

Processing node 200 operates to provide an environment for running applications. In a particular embodiment, processing node 200 runs an operating system (OS) that establishes a dedicated environment for running the applications.

For example, processing node 200 can run a Microsoft Windows Server OS, a Linux OS, a Novell OS, or another OS, as needed or desired. In another embodiment, processing node 200 runs a virtual machine manager (VMM), also called a hypervisor, that permits the processing node to establish more than one environment for running different applications. For example, processing node 200 can run a Microsoft Hyper-V hypervisor, a VMware ESX/ESXi virtual machine manager, a Citrix XenServer virtual machine monitor, or another virtual machine manager or hypervisor, as needed or desired. When operating in either a dedicated environment or a virtual machine environment, processing node 200 can store the OS software or the VMM software in main memory 220 or in SSD 240, or the software can be stored remotely and the processing node can retrieve the software via one or more of PCIe links 234. Further, in either the dedicated environment or the virtual machine environment, the respective OS or VMM includes device drivers that permit the OS or VMM to interact with PCIe devices, such as multi-function PCIe module 121, P2P endpoint 122, VDM endpoint 123, RRDMA endpoint 124, SAS endpoint 125, and RNC endpoint 126. In this way, the resources associated with input/output complex switch 110 are available to the OS or VMM and to the applications or OS's that are operating thereon.

Note that the embodiments of processing node 200 described herein are intended to be illustrative examples of processing nodes, and are not intended to be limiting. As such, the skilled artisan will recognize that the described embodiments are representative of a wide variety of available processing node architectures, and that any other such processing node architectures are similarly envisioned herein. Moreover, the skilled artisan will recognize that processing node architectures are rapidly changing, and that future processing node architectures are likewise envisioned herein.

Returning to FIG. 1, input/output switch complex 110 provides much of the functionality normally associated with a server processing node. For example, through associated P2P endpoints 122 and 132, processing nodes 191 and 194 access the functionality of a network interface cards (NICs) in network interface 150 that are connected to the P2P endpoints, thereby mitigating the need for separate NICs within each processing node. Similarly, through VDM endpoints 123 and 133, management controller 112 accesses uBMCs similar to uBMC 270 on processing nodes 191 and 194, in order to provide managed server functionality on the processing nodes without separate management interfaces on each processing node. Further, by accessing SAS endpoints 125 and 135, processing nodes 191 and 194 have access to a large, fast storage capacity that can replace, and can be more flexible than individual disk drives or drive arrays associated with each processing node.

Moreover, input/output complex switch 110 can include components that are needed by each processing node 191-194, but that are not often used. In a particular embodiment, RNC controller 170 includes a serial peripheral interface (SPI) connected to a non-volatile random access memory (NVRAM), a real time clock, a video interface, a keyboard/mouse interface, and a data logging port. The NVRAM provides a common repository for a wide variety of basic input/output systems (BIOSs) or extensible firmware interfaces (EFIs) that are matched to the variety of processing node architectures represented the different processing nodes 191-194. By accessing RNC endpoints 126 and 136 at boot, processing nodes 191 and 194 access the NVRAM to receive the associated BIOS or EFI, receive real time clock information, receive system clock information, and provide boot logging information to the data logging port, thereby mitigating the need for separate NVRAMs, real time clocks and associated batteries, and data logging ports on each processing node. Further, a support technician can provide keyboard, video, and mouse functionality through a single interface in input/output complex switch 110, and access processing nodes 191 and 194 through RNC endpoints 126 and 136, without separate interfaces on the processing nodes.

Further, input/output complex switch 110 provides enhanced functionality. In particular, input/output complex switch 110 provides consolidated server management for processing nodes 191-194 through management controller 112. Also, the NVRAM provides a single location to manage BIOSs and EFIs for a wide variety of processing nodes 191-194, and the common real time clock ensures that all processing nodes are maintaining a consistent time base. Moreover, RRDMA endpoints 124 and 134 provide improved data sharing capabilities between processing nodes 191-194 that are connected to a common input/output complex ASIC 120. For example, RRDMA endpoints 124 and 134 can implement a message passing interface (MPI) that permits associated processing nodes 191 and 194 to more directly share data, without having to incur the overhead of layer 2/layer3 switching involved in sharing data through switch ASIC 160. Note that the functionality described above is available via the PCIe link between processing nodes 191 and 194, and the associated multi-function PCIe modules 121 and 131, thereby providing further consolidation of interfaces needed by the processing nodes to perform the described functions. Further, the solution is scalable, in that, if the bandwidth of the PCIe links become constrained, the number of lanes per link can be increased to accommodate the increased data loads, without otherwise significantly changing the architecture of processing nodes 191 and 194, or of input/output complex ASIC 120.

Further, note that, in consequence of input/output switch complex 110 providing the functionality normally associated with a processing node, when connected to the input/output complex switch, processing nodes 191-194 are maintained as stateless or nearly stateless processing nodes. Thus, in a particular embodiment, processing nodes 191-194 can lose all context and state information when the processing nodes are powered off, and any context and state information that is needed upon boot is supplied by input/output switch complex 110. For example, processing node 191 does not need to maintain a non-volatile image of a system BIOS or EFI because RNC controller 170 supplies the processing node with the BIOS or EFI via RNC endpoint 126. Similarly, any firmware that may be needed by processing node 191 can be supplied by RNC controller 170.

Figure 3:
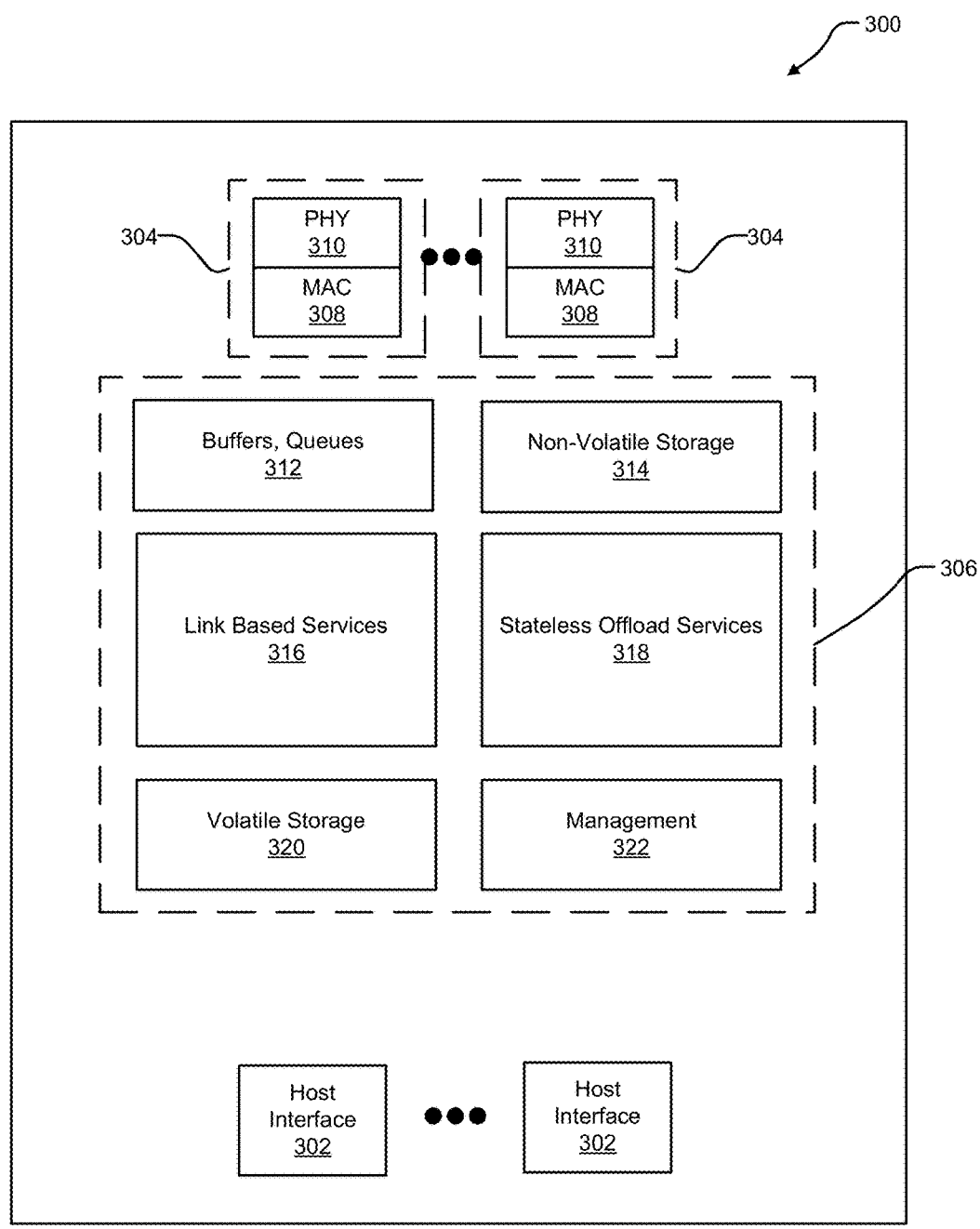
FIG. 3 is a block diagram illustrating a network interface application specific integrated circuit (ASIC) according to an embodiment of the present disclosure.

FIG. 3 is a block diagram illustrating an exemplary network interface ASIC 300 similar to network interface ASIC 150, according to various embodiments. Network interface ASIC 300 can provide one or more instances of a network interface for each of a plurality of processing nodes, such as processing node 191. As such, network interface ASIC 300 can be configured to communicate with the processing nodes and with upstream network elements.

Network interface ASIC 300 can include a plurality of host interfaces 302, a plurality of upstream network interfaces 304, and a shared resource 306. Host interfaces 302 can be configured to communicate with processing nodes, such as processing node 181. In various embodiments, host interfaces 302 can be implemented as PCIe interfaces.

Upstream network interfaces 304 can include a MAC (Media Access Control) layer 308 and a physical layer 310. Upstream network interface 304 can be configured to communicate with upstream network elements, such as switch ASIC 160. In various embodiments, upstream network interfaces 304 can be implemented as Ethernet interfaces, such as 100BASE-TX, 1000BASE-T, 10GBASE-R, or the like.

Shared resource 306 can include buffers and queues block 312, non-volatile storage 314, link based services 316, stateless offload services 318, volatile storage 320, and management block 322. Buffers and queues block 312 can be configured to provide a unified pool of resources to implement multiple buffers and queues for handling the flow of traffic among processing nodes and upstream network elements. These can include transmit and receive buffers for each instance of a network interface. In various embodiments, buffers and queues block 312 can further implement priority queues for network traffic for network interface instances. In various embodiments, the unified pool of resources can be dynamically allocated between network interface instances; either during instantiation of the network interface instances or while operating, such as based on network resource usage.

Link based services 316 can be configured to provide a unified mechanism for providing link based services, such as bandwidth policing, prioritization, and flow control, for the network interface instances. For example, link based services 316 can implement priority flow control mechanisms, such as using IEEE Std. 802.3x to provide flow control for a connection or using IEEE Std. 802.1Qbb to provide priority based flow control, such as for a class of service. In another example, link based services 316 can be configured to provide congestion management, for example using congestion notification (such as IEEE Std. 802.1Qau) or other mechanisms to manage congestion among processing nodes and between processing nodes and upstream network elements. In another example, link based services 316 can provide traffic prioritization, such as by implementing prioritization mechanism such as enhanced transmission selection (such as IEEE Std. 802.1Qaz) or other mechanisms.

Stateless offload services 318 can be configured to provide a unified mechanism for providing stateless offload services, such as TCP segmentation offload, checksum offload, and the like, for the network interface instances.

Non-volatile storage 314 and volatile storage 320 can be configured to provide common pools of resources across the network interface instances. For example, non-volatile storage 314 can be configured to store a firmware that is common to a plurality of network interface instances, rather than storing an individual firmware for each instance. Similarly, volatile storage 320 can be configured to store information related to network destinations, such as a unified address resolution protocol (ARP) table, neighbor discover protocol (NDP) table, or a unified routing table, that can be accessed by a plurality of network interface instances. In various embodiments, non-volatile storage 314 and volatile storage 320 may store information that is unique to a network interface instance that may not be accessed by other network instances. Examples may include specific configuration information, encryption keys, or the like.

Management block 322 can provide unified management of shared resources for the network interface instances. Management block 322 can be configured to provide set-up and tear-down services for a network interface instance, such that when a processing node needs to establish a network interface, the management block 322 can direct the configuration of resources needed to establish the network interface instance, or when the instance is no longer needed, the management block 322 can direct the freeing of the resources.

Figure 4:
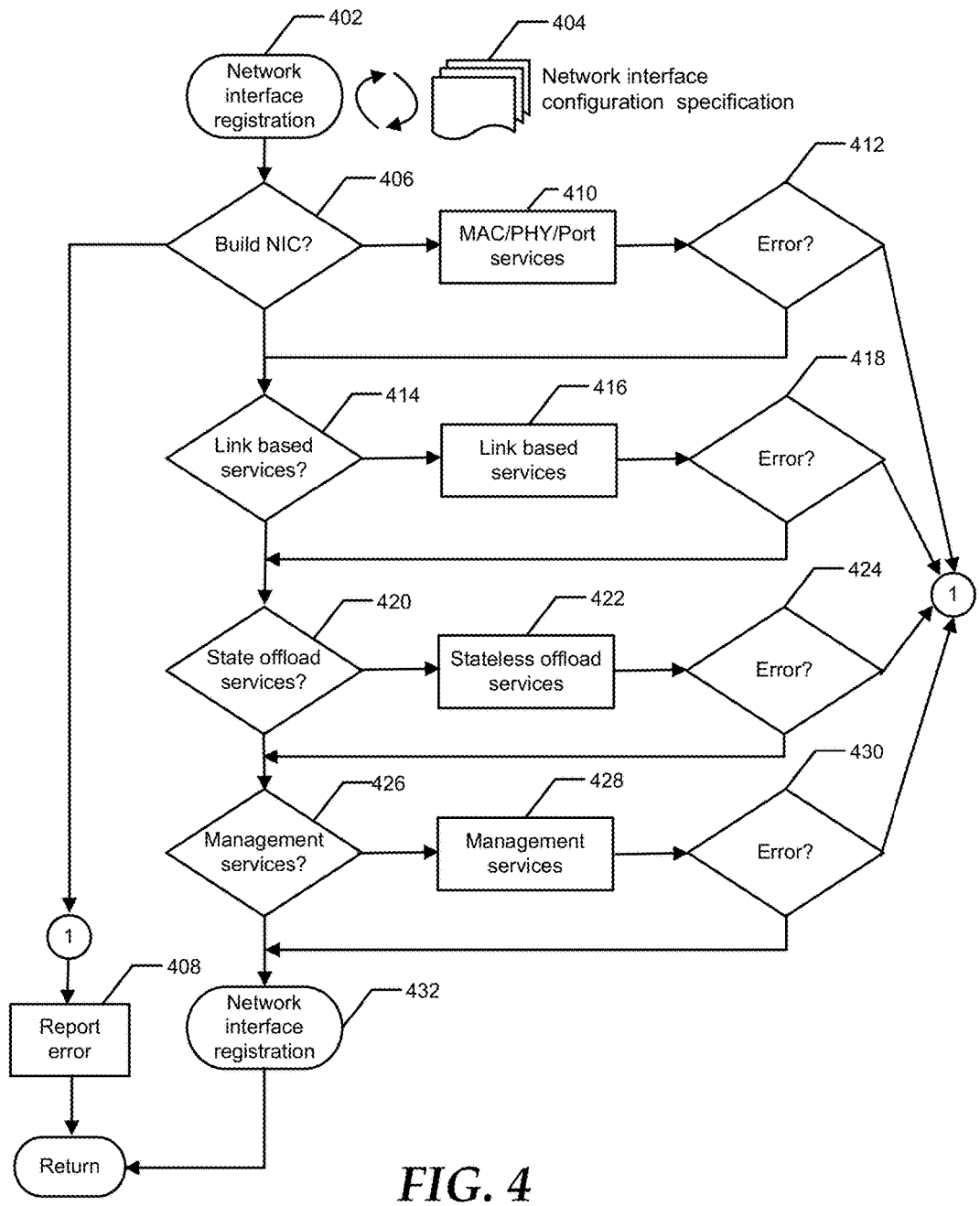
FIG. 4 is a flow diagram illustrating a method of registering a network interface within a network interface ASIC according to an embodiment of the present disclosure.

FIG. 4 is a flow diagram illustrating an exemplary method of registering a network interface within a network interface ASIC. At 402, a processing node can request registration of a network interface, for example at startup. Additionally, at 404, the processing node or the network interface ASIC can address a network interface configuration specification.

At 406, creation of a network interface instance can be attempted. If a network interface instance is unable to be created, then an error can be reported, as indicated at 408.

Alternatively, when a network interface instance can be created, MAC layer services, a physical layer services, and port level services can be established, as indicated at 410. At 412, a check for an error when establishing the MAC layer, physical layer, and port level services can be performed. When an error is detected, the error can be reported as indicated at 408.

Alternatively, when establishment of the MAC layer, physical layer, and port level services is successful, at 414, a determination can be made as to the need for link based services, such as bandwidth policing, congestion control, and the like. When link layer services are required, the link layer services can be established at 416, and an error check on the link layer services can be performed at 418. When there is an error with establishing link layer services, the error can be reported at 408.

Alternatively, from 414 when link layer services are not needed, or from 418 when the link layer services are established without an error, a determination can be made at 420 as to the need for stateless offload services, such as checksum and TCP segmentation offload. When the stateless offload services are required, the stateless offload services can be established at 422, and an error check on the stateless offload services can be performed at 424. When there is an error with establishing stateless offload services, the error can be reported at 408.

Alternatively, from 420 when stateless offload services are not needed, or from 424 when the stateless offload services are established without an error, a determination can be made at 426 as to the need for management services. When the management services are required, the management services can be established at 428, and an error check on the management services can be performed at 430. When there is an error with establishing management services, the error can be reported at 408.

Alternatively, from 426 when management services are not needed, or from 430 when the management services are established without an error, the network interface can be registered at 432.

Figure 5:
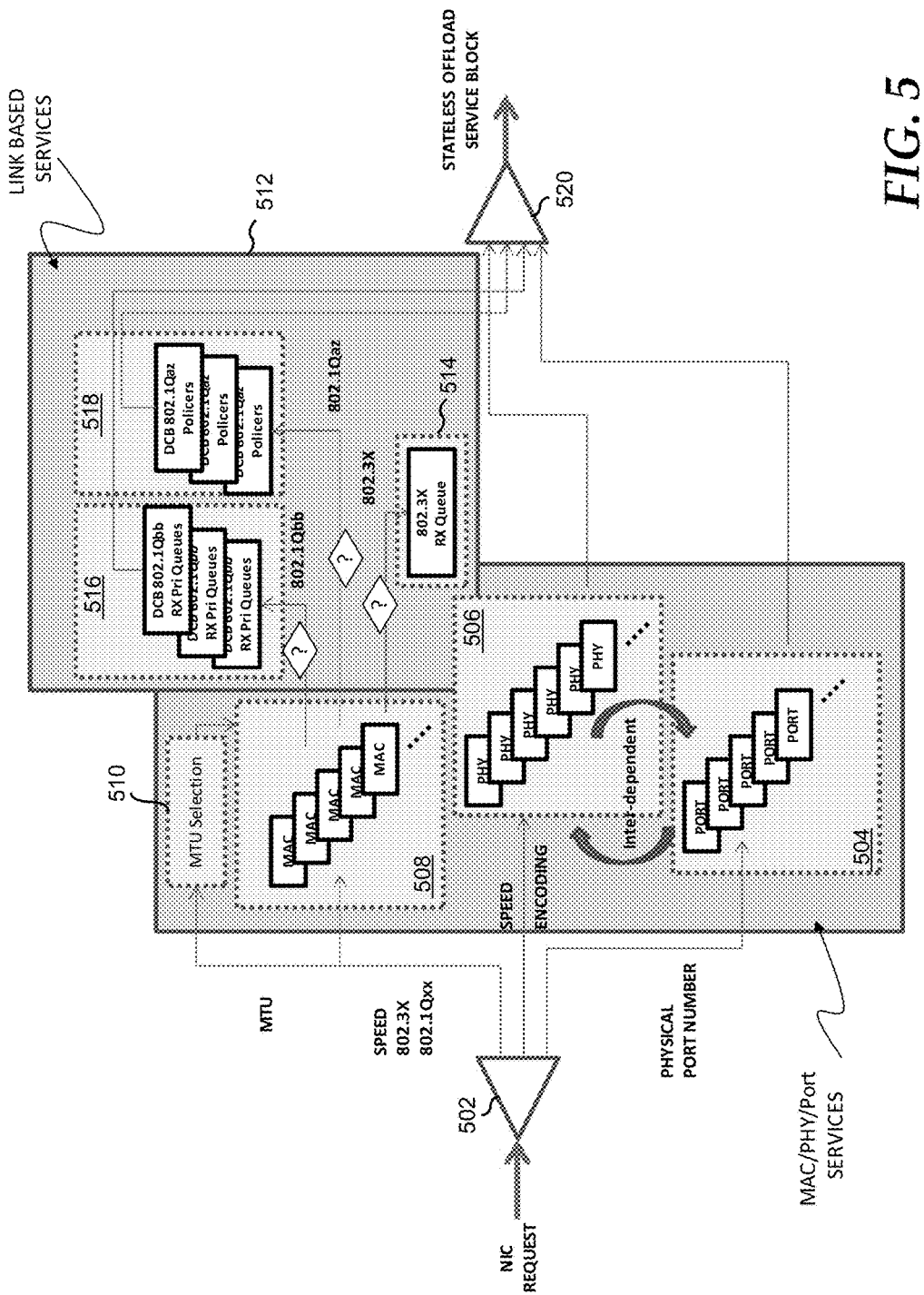
FIG. 5 is a block diagram illustrating the establishment of MAC layer, physical layer, port level, and link based services according to an embodiment of the present disclosure.

FIG. 5 is a diagram illustrating the establishment of MAC layer, physical layer, port level, and link based services. At 502, a request, for example to establish a network connection, to a network interface instance can be received. The request can be divided into several subcomponents, and each subcomponent can be passed to the appropriate service. A request for a physical port number can be passed to the port level services 504, and a request for appropriate encoding and network speed selection can be passed to the physical layer services 506. There can be interaction between the port level services 504 and the physical layer services 506 to resolve interdependencies between the port number selection and the encoding.

Further, requests for MAC layer services, including requests for link based services, such as bandwidth policing, congestion notification, flow control, quality of service, prioritization, and the like can be sent to the MAC layer services 508. Additionally, a request for an MTU (maximum transmission unit) can be sent to MTU selection 510. MTU Selection 510 can determine an MTU for the connection and provide MTU to the MAC layer services 508.

MAC layer services 508 can break out the requests for various link based services and send the requests link based services 512. For example, requests for flow control (such as IEEE Std. 802.3x) can be sent to the RX queue 514 to enable flow control for the connection. Requests for priority flow control (such as IEEE Std. 802.1Qbb) can be sent to the RX priority queues 516 to create priority receive queues for handling traffic of different classes and to enable flow control independently for the classes. Requests for bandwidth policing can be sent to the policers 518 to allocate bandwidth to different classes of traffic. As each of the subrequests is handled, information can be aggregated at 520 and passed to the stateless offload services block.

Figure 6:
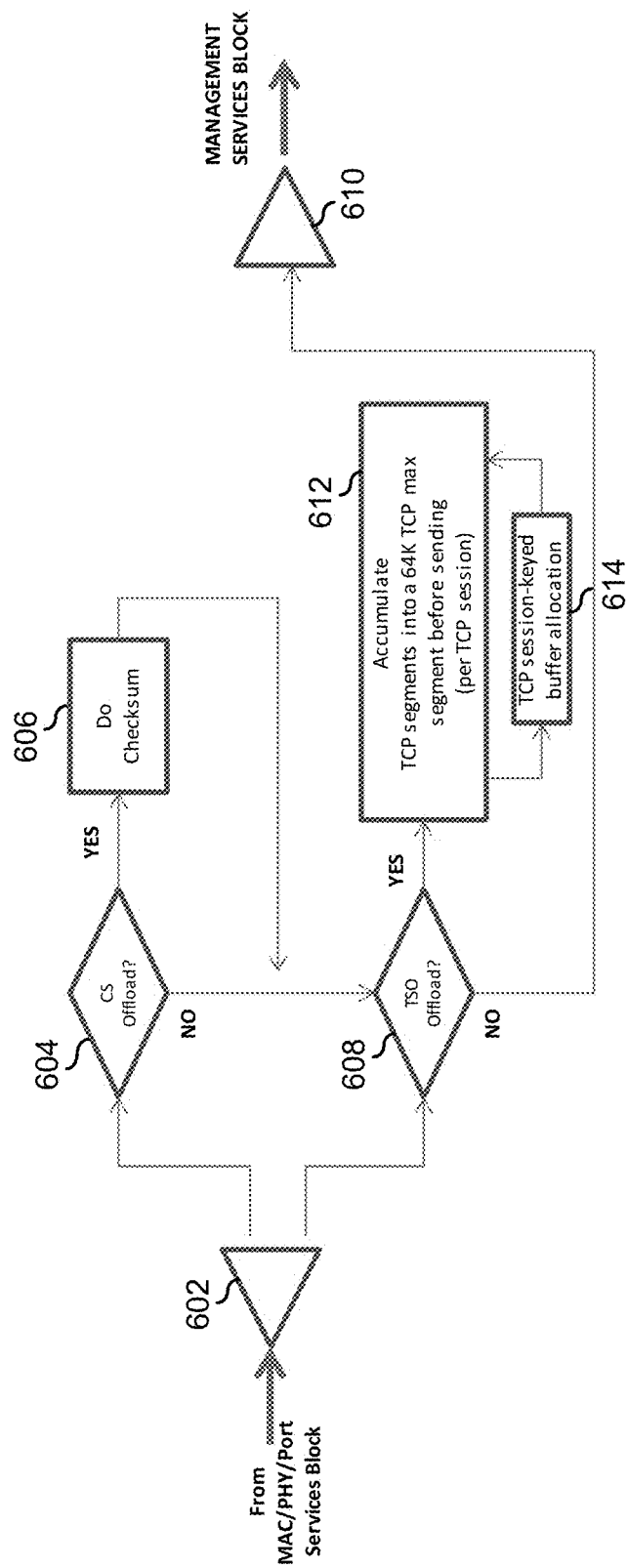
FIG. 6 is a block diagram illustrating the processing of stateless services according to an embodiment of the present disclosure.

FIG. 6 is a diagram illustrating the processing of stateless services. At 602, information can be received from the MAC layer, physical layer, and port level services block. A determination can be made at 604 regarding the need for a checksum offload. When there is a need for a checksum offload, a checksum can be determined at 606. When there is not a need for a checksum offload or when the checksum has been determined, a determination can be made at 608 regarding the need for a TCP segmentation offload. When there is not a need for TCP segmentation offload, the information can be passed to the management services block at 610.

Alternatively, when TCP segmentation offload is needed, TCP segments from a TCP session can be accumulated into a TCP max segment before sending, as indicated at 612. At the onset of accumulation, a TCP session keyed buffer can be allocated at 614 for storing the TCP segments until the TCP max segment can be sent, such as until sufficient number of segments have been accumulated for generating the TCP max segment.

Figure 7:
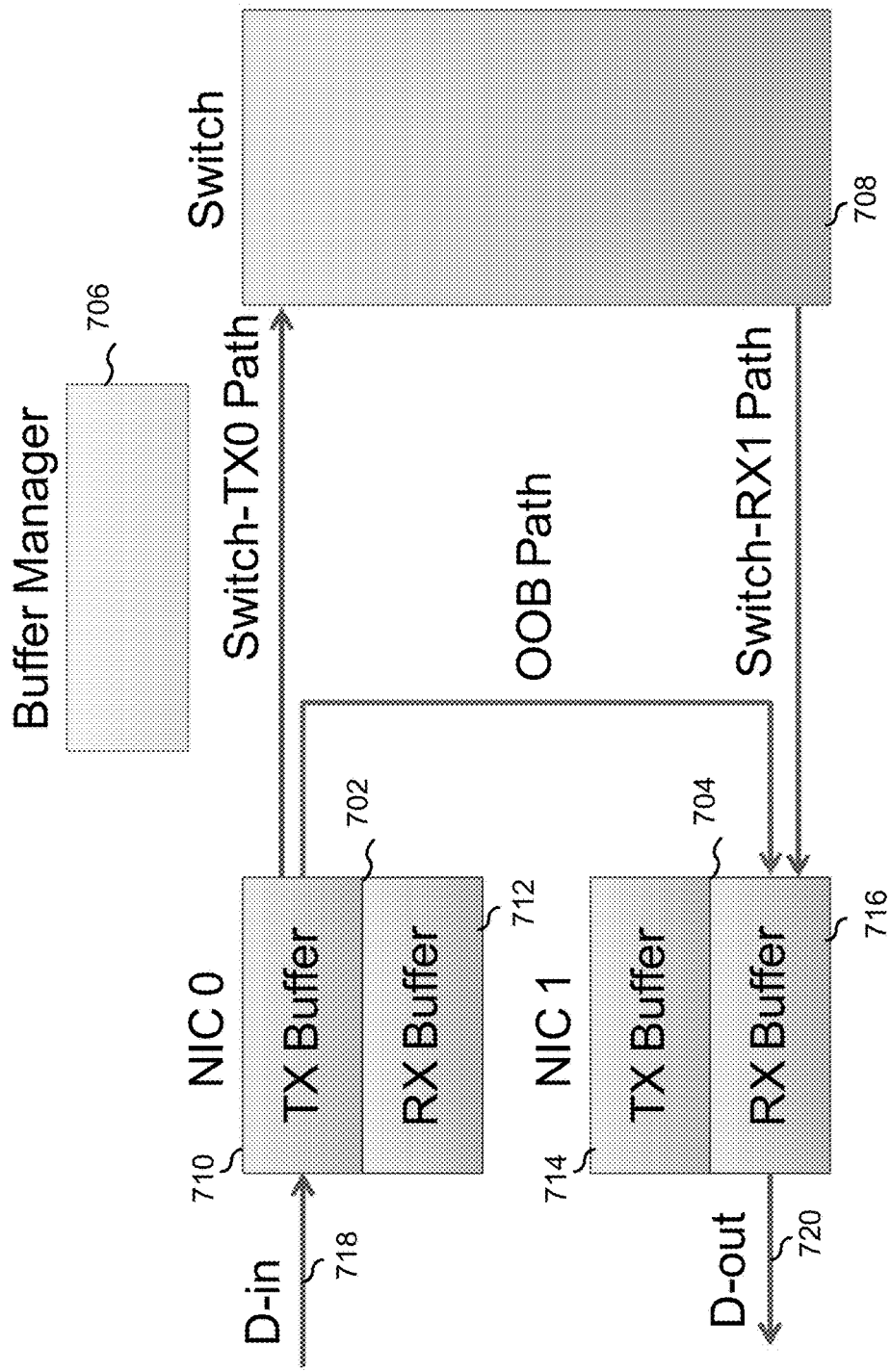
FIG. 7 is a block diagram illustrating out-of-band communication between two processing nodes according to an embodiment of the present disclosure.

In various embodiments, the Network Interface ASIC can provide out-of-band communication between nodes. FIG. 7 is a block diagram 700 illustrating out-of-band communication between two processing nodes. Block diagram 700 can include network interface instance 702, network interface instance 704, buffer manager 706, and switch 708. Network interface instance 702 can include transmit buffer 710 and receive buffer 712 and network interface instance 704 can include transmit buffer 714 and receive buffer 716. Additionally network interface instance 702 can communicate with a first processing node via D-in 718 and network interface instance 704 can communicate with a second processing node via D-out 720.

Buffer manager 706 can monitor traffic received on D-in 718. Traffic directed to upstream network elements, such as other computers on the Internet, can be placed into the transmit buffer 710 and passed to switch 708. Alternatively, traffic intended for the second processing node can bypass switch 708 and can be placed directly into receive buffer 714 of network interface instance 704 establishing an out-of-band path for the traffic.

In various embodiments, the out-of-band path can be implemented by providing dedicated receive buffers within each network interface instance for the each of the other network interface instances. Alternatively, the out-of-band path can be implemented with fewer dedicated receive buffers, such as by allowing out-of-band data from multiple other processing nodes to be writing to one receive buffer within a network interface instance.

In various embodiments, an out-of-band communication link can also be established by providing direct memory access over a PCIe path from the first node to the Network Interface ASIC to the second node. Specifically, when the out-of-band path is created within the Network Interface ASIC, data may be passed directly to the memory on the second node without needing to place it into the receive buffer 714.

Figure 8:
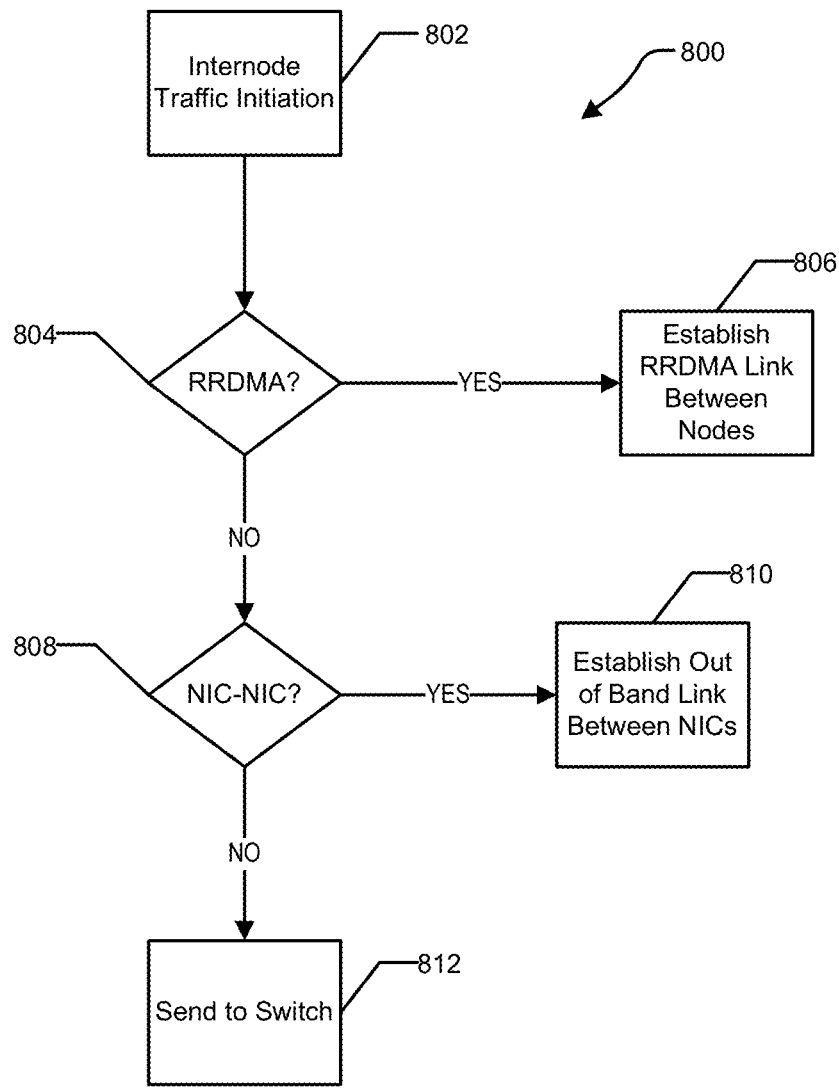
FIG. 8 is a flow diagram illustrating internode traffic routing according to an embodiment of the present disclosure.

In various embodiments, high priority internode communication can be improved by avoiding congestion within a converged network. Using embodiments described herein, node to node connections can be established at various network levels, depending on the type of traffic, availability of connection types, and the like. FIG. 8 is an exemplary flow diagram illustrating internode traffic routing.

At 802, internode traffic communication between two nodes can be initiated. In various embodiments, the internode traffic can be high priority, high bandwidth traffic, such as a transfer of large data or a virtual machine from one processing node to another. Due to the size and priority of the traffic, it may be advantageous to minimize the impact of network congestion during the transfer of the data.

At 804, it can be determined if the traffic is suitable for communication using RRDMA. In various embodiments, RRDMA may provide a suitable interface when the software needing to transfer the data is RRDMA aware and when the processing nodes are connected to a common input/output Complex ASIC. When RRDMA is suitable for the internode communication, a link can be established between the RRDMA instances for the two processing nodes within the input/output Complex ASIC, as indicated at 806.

At 808, it can be determined if the traffic is suitable for communication using an out-of-band link. In various embodiments, an out-of-band link may provide a suitable path when the processing nodes share a common network interface ASIC. When the out-of-band link is suitable for the internode communication, a link can be established between the network interface instances within the network interface ASIC, as indicated at 810. In various embodiments, the out-of-band link can be configured to pass communication from a first node directly into the receive buffer of the network interface instance for a second node, thereby bypassing the transmit buffer, the upstream network interface, and any upstream switching architecture. Further, depending on the priority of the traffic, congestion control mechanisms can be employed to pause or slow communication from other processing nodes or upstream network elements that may otherwise enter the receive queue of the second processing node, thereby maximizing the bandwidth available for the internode communication.

At 812, when a direct NIC to NIC link is not appropriate, communication can occur along with regular network traffic by being passed from the first processing node up to the switch and then back down to the second processing node. In general, using this path may have a higher latency and lower bandwidth than either the RRDMA link or the NIC-NIC link, as the switch processing overhead and congestion caused by other network traffic passing through the switch may slow the data transfer.

In various embodiments, the Network Interface ASIC can provide simplified congestion management for the processing nodes. For example, congestion management can require each node in a communication path to share information, such as buffer states, to ensure that one node is not overrun with data. Specifically, when a node's buffer is near capacity, the node can notify other nodes in the path to pause or delay sending additional data until buffer space can be freed. The Network Interface ASIC can be aware of the buffer state for the buffers of the network interface instances without the need for additional information passing. Thus, when a network interface instance is near overflow, the network interface ASIC can pause or slow data flow from other network interface instances to the instance that is near overflow until the condition is passed.

In various embodiments, congestion management can be implemented by deferring data flow from the processing node to the network interface ASIC until resources, such as buffer space, are allocated and reserved for receiving the data. The resources for receiving the data can be, for example, available space in a transmit queue at an outbound port, or, for out-of-band communication, reserved memory space at a destination computing node. Once the destination resources are available, the data can be pulled from the source node and passed to the destination resource without the need for buffering within the network interface ASIC while the resources are made available. Advantageously, this can allow out-of-order transmission of data from the source node as data for a destination where the resources that are already available can be sent while data that is waiting for destination resources to be made available can be delayed. This can prevent transmission of data from the source node to the network interface ASIC from being delayed due to a buffer that is filled with data awaiting destination resources.

Figure 9:
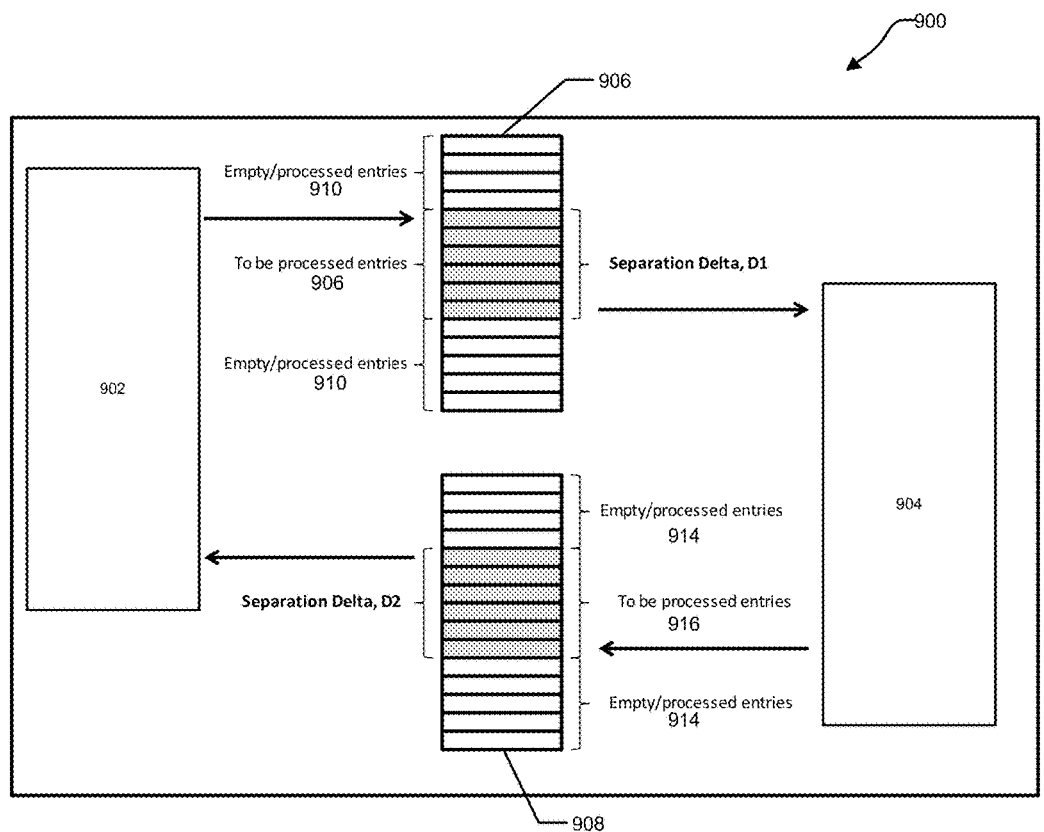
FIGS. 9 and 10 are diagram illustrating the use of shared queues for flow control for out-of-band communication within a network interface ASIC according to an embodiment of the present disclosure.

In various embodiments, flow control can be provided for the out of band communication between two processing nodes by implementing shared directional queues between network interface instances within the network interface ASIC. FIG. 9 is a diagram illustrating the use of shared cues for flow control in a network interface ASIC. Communication between network interface instance 902 and network interface instance 904 can proceed via queue 906 and queue 908.

Queue 906 can include a plurality of empty or processed entries 910 and a plurality of 'to be processed' entries 912. When network interface instance 902 is ready to send data to network interface instance 904, network interface instance 902 can add entries to queue 906. When the number of empty or processed slots 910 falls below a threshold, network interface instance 902 can wait to add entries to queue 906 until more empty or processed slots 910 are available. In various embodiments, network interface instance 902 can determine an amount of time to wait based on a queue quanta and a separation delta. The separation delta may be a minimum number of 'to be processed' entries 912 that are maintained within the queue. When network interface instance 904 is ready to receive data from network interface instance 902, network interface instance 904 can process or remove entries from queue 906. When the number of 'to be processed' entries 912 falls below a separation delta, network interface instance 904 can wait to process entries from queue 906 until more 'to be processed' entries 912 are available.

Similarly, queue 908 can include a plurality of empty or processed slots 914 and a plurality of 'to be processed' entries 916. When network interface instance 904 is ready to send data to network interface instance 902, network interface instance 904 can add entries to queue 908. When the number of empty or processed slots 914 falls below a threshold, network interface instance 902 can wait to add entries to queue 906 until more empty or processed slots 914 are available. In various embodiments, network interface instance 904 can determine an amount of time to wait based on a queue quanta and a separation delta. When network interface instance 902 is ready to receive data from network interface instance 904, network interface instance 902 can process or remove entries from queue 908. When the number of 'to be processed' entries 916 falls below a separation threshold, network interface instance 902 can wait to process entries from queue 908 until more 'to be processed' entries 916 are available.

Figure 10:
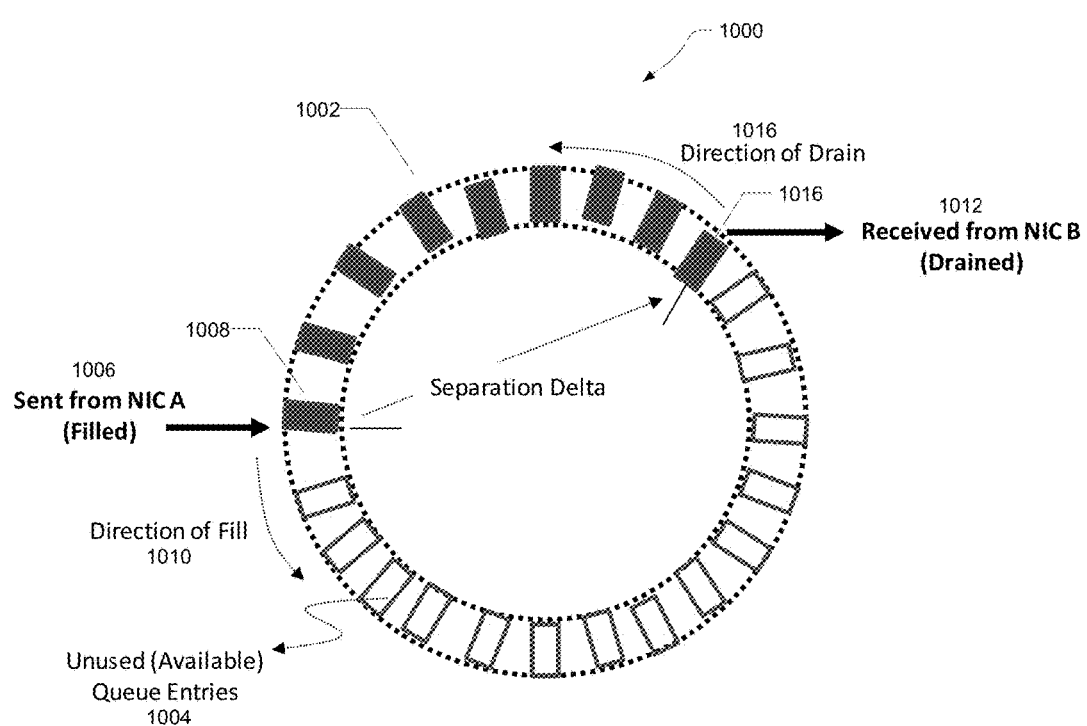

FIG. 10 is a diagram illustrating an exemplary circular queue for implementing flow control for out-of-band communication with a network interface ASIC. Circular Queue 1000 includes filled slots 1002 and available slots 1004. Data sent from network interface instance 1006 is added to a head 1008 of the filled slots 1002 in a direction of fill 1010 while there are a sufficient number of available slots 1004 within circular queue 1000. Similarly, network interface instance 1012 can process data from circular queue 1000 from a tail 1014 of the filled slots 1002 in a direction of drain 1016 while there are a sufficient number of filled slots 1002 within circular queue 1000. Direction of fill 910 and direction of drain 1016 can be parallel. When the number of available slots 1004 falls below a threshold, network interface instance 1006 can wait to send additional data. When the number of filled slots 1002 falls below a separation delta, network interface instance 1006 can wait to receive data from the queue.

Maintaining a threshold number of available slots within the queue ensures that network interface instance 1006 does not send data faster than network interface instance 1012 can process. Additionally, maintaining a separation delta within the queue ensures that network interface instance 1012 does not over run the filled slots 1002 and attempt to process unused slots 1004. Thus, circular queue 1000 can provide flow control without requiring a pause instruction to be sent from network interface instance 1012 to network interface instance 1006 in order to prevent loss of data due to a buffer overflow.

Returning to FIG. 1, VDM block 140 operates to provide a single interface for management controller 112 to access VDM endpoints 123 and 133 and one or more additional VDM endpoints associated with the one or more additional multi-function PCIe modules. As such, VDM endpoints 123 and 133 are connected to VDM block 140, and the VDM block is connected to management controller 112. In a particular embodiment, VDM endpoints 123 and 133 each have a dedicated connection to VDM block 140. In another embodiment, VDM endpoints 123 and 133 share a common bus connection to VDM block 140. In either embodiment, VDM block 140 operates to receive management transactions from management controller 112 that are targeted to one or more of processing nodes 191-194, and to forward the management transactions to the associated VDM endpoint 123 or 133 targeted processing node. For example, a technician may wish to determine an operating state of processing node 191, and can send a vendor defined message over the PCIe link between the processing node and VDM endpoint 123, and that is targeted to a uBMC on the processing node that is similar to uBMC 270. The uBMC can obtain the operating information from processing node 191, and send a vendor defined message that includes the operating information to VDM endpoint 123. When VDM block 140 receives the operating information from VDM endpoint 123, the VDM block forwards the operating information to management controller 112 for use by the technician. The technician may similarly send vendor defined messages to the uBMC to change an operating state of processing node 191.

In a particular embodiment, the uBMC on one or more of processing nodes 191-194 represents a full function BMC, such as a Dell DRAC, an Intel Active Management Technology controller, or another BMC that operates to provide platform management features including environmental control functions such as system fan, temperature, power, and voltage control, and the like, and higher level functions such as platform deployment, asset management, configuration management, platform BIOS, EFI, and firmware update functions, and the like. In another embodiment, the uBMC on one or more of processing nodes 191-194 represent a reduced function BMC that operates to provide the environmental control functions, while the higher level functions are performed via RNC controller 170, as described below. In yet another embodiment, one or more of processing nodes 191-194 do not include a uBMC, but the environmental control functions are controlled via a northbridge such as northbridge 230, that is configured to handle platform environmental control functions.

RRDMA block 142 provides MPI messaging between processing nodes 191-194 via RRDMA endpoints 124 and 134 and one or more additional RRDMA endpoints associated with the one or more additional multi-function PCIe modules. As such, RRDMA endpoints 124 and 134 are connected to RRDMA block 142 via a dedicated connection to the RRDMA block, or via a common bus connection to the RRDMA block. In operation, when a processing node, such as processing node 191 needs to send data to another processing node, an RRDMA device driver determines if the other processing node is connected to input/output complex ASIC 120, or is otherwise accessible through layer2/layer3 switching. If the other processing node is accessible through layer2/layer3 switching, then the RRDMA driver encapsulates the data into transmission control protocol/Internet protocol (TCP/IP) packets that include the target processing node as the destination address. The RRDMA driver then directs the packets to P2P endpoint 122 for routing through the associated NIC in network interface ASIC 150 based upon the destination address.

If, however, the other processing node is connected to input/output complex ASIC 120, such as processing node 194, then the RRDMA driver encapsulates the data as an MPI message that is targeted to processing node 194. The RRDMA driver then issues an MPI message to RRDMA endpoint 124 to ring a doorbell associated with processing node 194. The MPI message is received from RRDMA endpoint 124 by RRDMA block 142, which determines that processing node 194 is the target, and issues the message to RRDMA endpoint 134. An RRDMA driver in processing node 194 determines when the processing node is ready to receive the data and issues an MPI reply to RRDMA endpoint 134. The MPI reply is received from RRDMA endpoint 134 by RRDMA block 142 which issues the message to RRDMA endpoint 124. The RRDMA driver in processing node 191 then sends the data via RRDMA block 142 to processing node 194. In a particular embodiment, the MPI messaging between processing nodes 191-194 utilize InfiniBand communications. In another embodiment, the RRDMA drivers in processing nodes 191-194 utilize a small computer system interface (SCSI) RDMA protocol.

Note that utilizing RRDMA block 142 for MPI data transfers provides a more direct path for data transfers between processing nodes 191-194 than is utilized in layer2/layer 3 data transfers. In addition, because processing nodes 191-194 are closely connected to input/output complex switch 110, MPI data transfers can be more secure than layer2/layer3 data transfers. Moreover, because the data is not encapsulated into TCP/IP packets, MPI data transfers through RRDMA block 142 do not incur the added processing needed to encapsulate the data, and the data transfers are less susceptible to fragmentation and segmentation than would be the case for layer 2/layer 3 data transfers.

SAS block 144 operates to provide processing nodes 191-194 with access to a large, fast, and flexible storage capacity via SAS endpoints 125 and 135 and one or more additional SAS endpoints associated with the one or more additional multi-function PCIe modules. As such, SAS endpoints 125 and 135 are connected to SAS block 144 via a dedicated connection to the SAS block, or via a common bus connection to the SAS block. In operation, when a processing node, such as processing node 191 needs to store or retrieve data, an SAS device driver in the processing node issues the appropriate SCSI transactions to SAS endpoint 125, and the SAS endpoint forwards the SCSI transactions to SAS block 144. SAS block 144 is connected via a SAS connection to a storage device, and issues the SCSI transactions from SAS endpoint 125 to the attached storage device. In a particular embodiment, the storage device includes one or more disk drives, arrays of disk drives, other storage devices, or a combination thereof. For example, the storage device can include virtual drives and partitions that are each allocated to one or more processing node 191-194. In another embodiment, SAS block 144 operates to dynamically allocate the storage resources of the storage device based upon the actual or expected usage of processing nodes 191-194. In yet another embodiment, SAS block 144 operates as a redundant array of independent drives (RAID) controller.

Figure 11:
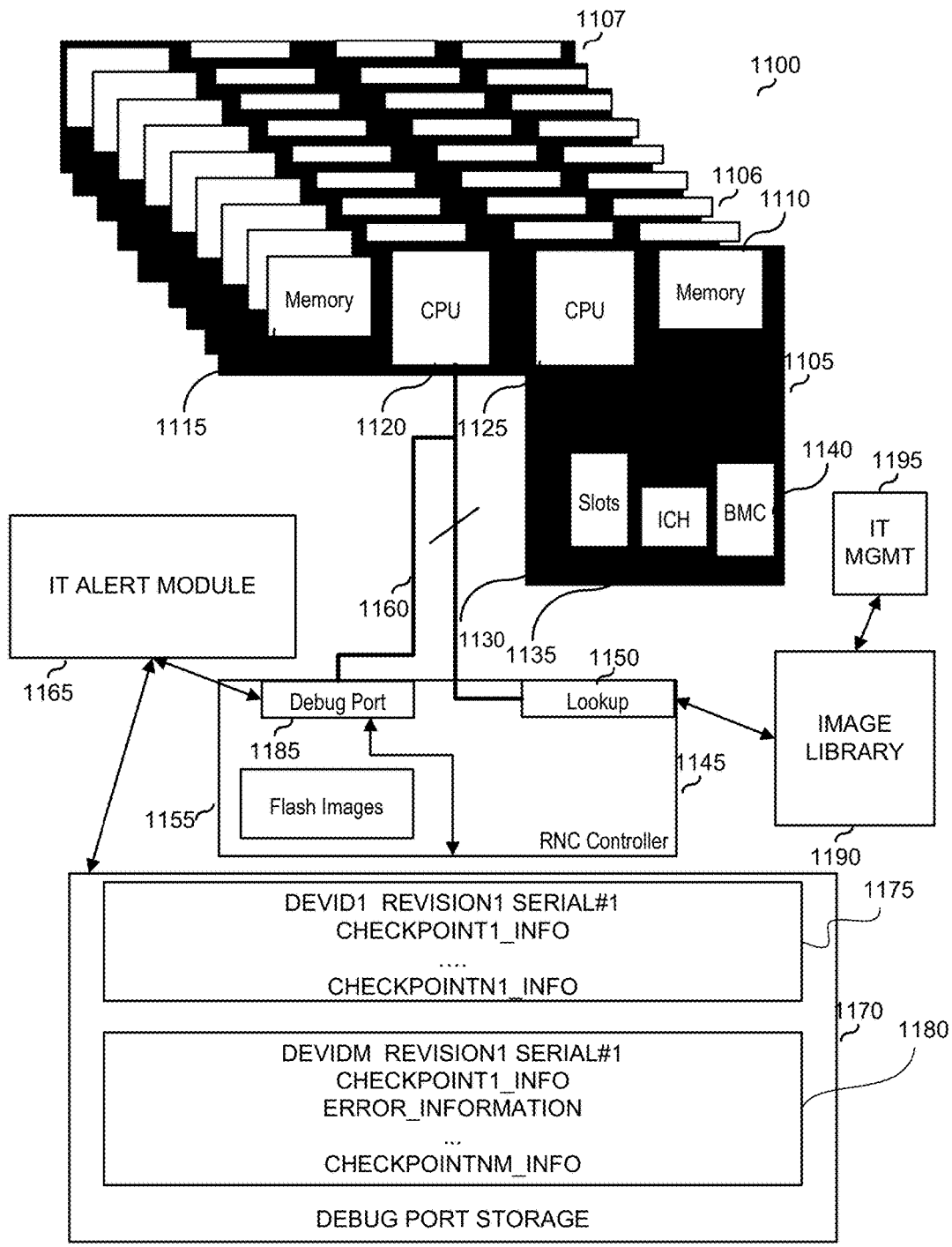
FIGS. 11-13 are block diagrams illustrating processing systems according to different embodiments of the present disclosure.

FIG. 11 shows a processing system 1100 that includes processing nodes 1105, 1106 and 1107; RNC controller 1145; Information Technology (IT) alert module 1165; image library 1190, and IT management module 1195. Processing system 1100 may represent a portion of processing system 100 of FIG. 1 and may represent a highly scalable networked data processing system. Processing nodes 1105, 1106 and 1107 include memories 1110 and 1115, CPUs 1120 and 1125, slots 1130, input/output control hubs (ICH) 1135, and baseboard management controllers 1140. In some embodiments, processing nodes 1105, 1106 and 1107 may correspond to processing node 200 of FIG. 2. Slots 1130 may correspond to PCIe slots 250, ICH 1135 may correspond to Southbridge 260, CPUs 1125 may correspond to Processor 210; and BMC 1140 may correspond to VDM based UBMC 270.

RNC controller 1145 contains BIOS code lookup module 1150, flash images 1155, and debug port 1185. RNC controller 1145 may correspond to RNC controller 170 of FIG. 1 and may be a component of an input/output complex switch such as input/output complex switch 110 of FIG. 1. Lookup 1150 and flash images 1155 may correspond to the serial peripheral interface portion of RNC controller 170, and debug port 1185 may correspond to the port 80 portion of RNC controller 170.

Processing nodes 1105, 1106 and 1107 are connected to RNC controller 1145 by PCIe link 1160. Only a portion of the complete path from the processing nodes 1105, 1106, and 1107 to RNC controller 1145 is shown in FIG. 11. A more complete path may correspond to the path from the processing nodes 190 to RNC controller 170 of FIG. 1. The more complete path may travel from the processing nodes to a multi-function PCIe module, an RNC endpoint, an RNC block, and finally to an RNC controller such as RNC controller 170 in the manner described in FIG. 1.

BIOS code lookup module 1150 may be adapted to look up the location of the correct boot image of processing nodes 1105, 1106, and 1107. The boot images may be indexed by type of hardware, version of hardware, type of operating system, and version of operating system or by other characteristics of processing nodes 1105, 1106, and 1107. In some embodiments, correct boot images may be made available to BIOS code lookup module 1150 by IT management 1195. The boot images may be contained on flash images 1155. In other embodiments, the boot images may be stored outside of RNC controller 1145, such as on an input/output complex switch or on non-volatile memory accessible through RNC controller 1145, such as from image library 1190.

In FIG. 11, the processing nodes 1105, 1106, and 1107 of processing system 1100 may boot over PCIe link 1160 from boot code stored in flash images 1155 on RNC controller 1145. As part of boot, a CPU of one of processing nodes 1105, 1106, and 1107 may initiate PCIe link 1160. The CPU may enumerate the multifunction (MF) PCIe endpoints, such as MF endpoints 101 in FIG. 1, and locate RNC controller 1145. Once PCIe link 1160 is initiated, the CPU may route its reset vector over PCIe link 1160 to RNC controller 1145.

The reset vector is the first segment of code the CPU is instructed to run upon boot. The CPU may obtain the code over PCIe link 1160 by sending a request to fetch that code (reset vector fetch) over PCIe link 1160. In some embodiments, the CPU would embed an identifier in the PCIe packet sent over PCIe link 1160 to fetch the code. The identifier may describe the device ID of the CPU or node, the hardware revision, information about software such as an operating system running on the node, and other information about the node. The MF PCIe would recognize the packet as a reset vector fetch and pass it on to the RNC block of the ASIC. That block may then send a packet to RNC controller 1145. The RNC controller in turn would recognize the packet, parse the identification information, and perform a look up based on the device ID, hardware revision, and other information to obtain a location in the flash contained on RNC controller from which to read the boot instructions. The RNC controller would then map the read instructions to that location. If the primary RNC controller is not available over a primary PCIe link, the PCIe complex in the CPU would route the reset vector over the secondary PCIe link to the secondary RNC controller, thus providing a redundant link path for the reset vector fetch.

In some embodiments, if the search through the lookup table did not produce a suitable boot image for the particular device and hardware version, then RNC controller 1145 would search for a boot image in other locations. In further embodiments, RNC controller 1145 might search for a suitable boot image in an internal location maintained by IT management. If that search also proved unsuccessful, RNC controller 1145 might support a phone home capability. With that capability, RNC controller 1145 could automatically download the up-to-date image from a download server by sending it a download request. RNC controller 1145 might lack current images if a new server was introduced into a server rack or a server underwent a hardware revision. In order to prevent a failure during an attempted boot, RNC controller 1145 may insert no-operation commands (NOPs) into the code provided as a result of the reset vector fetch as needed until the proper boot image was located on another RNC controller or phoning home obtained the correct image. Execution of a NOP generally has little or no effect, other than consuming time. By inserting NOPs at the beginning of the code the server was to execute at the beginning of boot, the server would be kept inactive until the proper code could be located. Then, that code could be sent to the CPU for execution.

In further embodiments, the functionality as described in FIG. 11 may ensure that servers and other processing nodes boot off the correct images and may simplify updating firmware. The lookup feature, based on device identification and hardware version, may enable the IT department to monitor entries in a lookup table or other data structure to control the boot image used by each configuration of server. Management tools may allow the IT department to specify which image any server should boot from, allowing IT to manage by server which version of flash each server should boot from. Further, having a uniform storage for boot images may simplify updating them. Management tools may enable the IT department to update the boot images used by multiple servers on a rack by updating one flash image on RNC controller 1145, thus greatly simplifying updates in comparison to updating the firmware in each of the servers. Moreover, the configuration makes it simpler to determine the need for updating boot images. For example, the IT department may configure the system to monitor updates sites for firmware images and download the latest version to ensure that the latest version is always available. In particular, a system might monitor Dell.com to ensure the latest flash revision for Dell servers is always available. Additionally, further embodiments may provide a phone home capability to provide a uniform mechanism for updating firmware.

In other embodiments, a CPU vendor may not support mapping the reset vector out via PCIe link 1160 to a RNC controller. In those embodiments, a server may encompass a flash image that contained the minimal amount of code to get the CPU up and running, to train the PCIe link, and to start fetching code from an RNC controller. In this case, the RNC controller may service the request for boot code using device emulation.

In these embodiments, the minimal boot code may have the same capabilities as in the embodiments above of using a primary and secondary PCIe link based on availability along with image location service and phone home service. In a few embodiments, some of processing nodes 1105, 1106, and 1107 may be able to boot from a Northbridge that has memory attached, rather than from non-volatile storage attached to a Southbridge. These embodiments may provide for non-volatile memory express communications combined with PCIe link communications to enable solid state drive communications between a CPU and non-volatile memory at boot time. In these embodiments, the minimal boot image could be placed in a solid state drive connected to the Northbridge.

Debug port 1185 of RNC controller 1145 is a port to capture debug information logged during the boot process. These captures may receive debug information during boot from processing nodes 1105, 1106, and 1107 of processing system 1100 and write it to debug port storage 1170. Debug port 1185 may consist of non-volatile memory accessible through the PCIe bus, and mapped in PCIe bus memory space. Debug port storage 1170 may provides a log of debug information during boot. The information may include, for each node of processing system 1100, an identification of the node, checkpoint information, and error information. In the illustration of FIG. 11, debug port storage 1180 contains data structures 1175 and 80 with boot process information from devices 1 and M, respectively. The entries illustrated in data structure 1175 contain checkpoint information. The entries illustrated in data structure 1180 contain both checkpoint information and error information. IT alert module 1165 may monitor the debug information passing through the 1 debug port 1185 and debug port storage 1170, check for error messages, and generate alerts if errors are found. In a particular embodiment, IT alert module 1165 is connect to a data center administration console via a standard Ethernet mechanism, and the IT alert module provides updates via an IT console dash board, mobile text alerts, email alert, or error states indicators or LCD panel on I/O complex switch 110.

In the embodiment of FIG. 11, debug port storage 1170 organizes the information by device. The information for device id 1 and the information for device id M are each kept in a separate portion of storage. In further embodiments, the identification of a device may be listed only once for the section of data pertaining to the device. In other embodiments, the file may be in chronological order. Each entry may include identification information for the device reporting the information. In a few embodiments, debug port 1185 may convert the boot debug information to a uniform format. It may, for example, use a uniform code to report errors. They may also use a uniform description of checkpoints passed. In other embodiments, the nature of the boot debug information may differ from device to device.

IT alert module 1165 may monitor the information received by debug port 1185. If the information includes an error message, then IT alert module 1165 may issue an alert. In some further embodiments, IT alert module 1165 may further take corrective measures. For example, if one of processing nodes 1105, 1106, and 1107 of processing system 1100 fails, IT alert module 1165 may order the booting of a spare server on the rack.

Some embodiments of FIG. 11 may provide rack level port debug centralization in PCIe memory space. The entries to debug port storage 1170 may be written automatically, in a uniform manner, and may be tagged with information about the host node. Embodiments of FIG. 11 may also provide for rack level automation of debug information to IT alerts. Because the information for a rack is written to a uniform place or places, it is relatively easy for IT alert module 1165 to access the information and to issue alerts as needed. Management automation tools may constantly monitor these debug codes and send alerts to IT as configured. This method simplifies IT operation by centralizing debug information and allows greater intelligence in aggregate. Many embodiments of FIG. 11 may also provide for rack level debug function redundancy thru a primary and secondary link. A node may attempt to write boot debug information over PCIe links to a primary RNC controller. If the primary RNC controller is unavailable, however, the node may be connected to a secondary RNC controller and may attempt to write the boot debug information to the secondary RNC controller.

These embodiments may provide an improvement over legacy methods. In legacy computer systems and rack systems, each server on the rack may have written boot debug information to an input/output port, such as port 80, in a proprietary format. The information may have been lost as soon as the node finished booting, because the port was then used for other purposes. Further, each server may have had a separate mechanism to alert for errors. Debug adapters, BMCs, and other modules are often used to latch this information during boot to alert the user where a server hung or had an error during initialization. In past architectures this was replicated on an individual server basis. Because there was no available method or mechanism for rack level logging of debug information, this burden was incurred on every server.

In many embodiments, the code for writing boot debug information is contained in BIOS. For these embodiments, the systems of FIG. 11 will enable the writing of port debug information in PCIe memory space. The BIOS code that directs the writing of debug information may be contained in flash images 1155. Even legacy systems that initially boot from a minimal BIOS will transfer booting to the BIOS of flash images 1155.

Image library 1190 may constitute an image library contained on bulk non-volatile storage. The library may include boot images, other Basic Input/output System BIOS and Firmware images, or Unified Extensible Firmware Interface (UEFI) modules. UEFI modules provide a software interface between operating systems and platform firmware, such as BIOS. IT management 1195 may maintain the images, determining when to add images, delete images, and replace images. Thus, IT management 1195 may function as a centralized chassis/resource manager for the images of image library 1190. IT management 1195 may add or remove images by procedures similar to a file-share procedure or through programmatic methods. IT management 1195 may also determine the assignment of images to processing nodes such as processing nodes 1105, 1106, and 1107. IT management 1195 may then write the images assigned to a processing node to the flash images module of a RNC controller connected to the processing node via a PCIe link and may update the lookup tables such as lookup table 1150.

In other embodiments, a RNC controller may obtain some or all of the images used by processing nodes from image library 1190 rather than storing the images on the switch itself. Upon booting, one of processing nodes 1105, 1106, and 1107 may fetch the assigned images from image library 1190 through a mechanism similar to the process for booting from a boot image of flash images 1155.

Some embodiments may provide for an easy testing prior to putting a new image into service generally through a system. An upgrade process may operate as follows:

IT management software may download and add to image library 1190 a new version of an image for a server from an Internet download site for the server, such as from the website of the server manufacturer.

A user, such as an IT management technician, may validate the new image by selecting the image for one processing node and rebooting the processing node.

If the processing node operates properly under the new image, the user may mark all other processing nodes to use new image upon next reboot.

The user may optionally schedule reboot of the other processing nodes to enable them to load the updated images.

In further embodiments, any devices with general load/store capabilities that are components of a networked data processing system such as system 100 of FIG. 1 may reference image library 1190. These devices may be local to a server node, such as RAID-controller devices, or may be a shared-device, such as a storage-controller.

Some embodiments of FIG. 11 may simplify the process of updating BIOS and other firmware. For example, it may enable a user to provide image/version management by using 1:N means. The user may download and test a single image and place it in the image library for use by multiple computers in a networked data processing system. In addition, some embodiments may provide easy-to-use methods for switching between multiple versions of images. To switch from one version of BIOS to another for a particular node, for example, the user may update an entry in lookup 1150 pertaining to that node or the user may replace a version in flash images 1155 with another version and reboot the node. In addition, embodiments may reduce the downtime from updating to the time needed to reboot a server or hot-reset a device. Since the images are stored off the server or device, it does not need to be idle when it is loading the image. Further, embodiments may ease implementation challenges with automated push. New software may be automatically downloaded, stored in image library 1190, and distributed to RNC controllers, thereby greatly reducing the effort required by management personnel. The result of embodiments of FIG. 11 may be the implementation of a live, consolidated, selectable image library for the processing nodes on a single rack or on a large collection of racks.

In some embodiments, a RNC controller may provide some, but not all of the functions shown in FIG. 11, or may contain fewer components. In some embodiments, for instance, booting may be done from BIOS in the individual nodes. In other embodiments, boot images may be contained outside of a RNC controller, such as on an external image library. In still other embodiments, a RNC controller may provide additional functionality.

Figure 12:
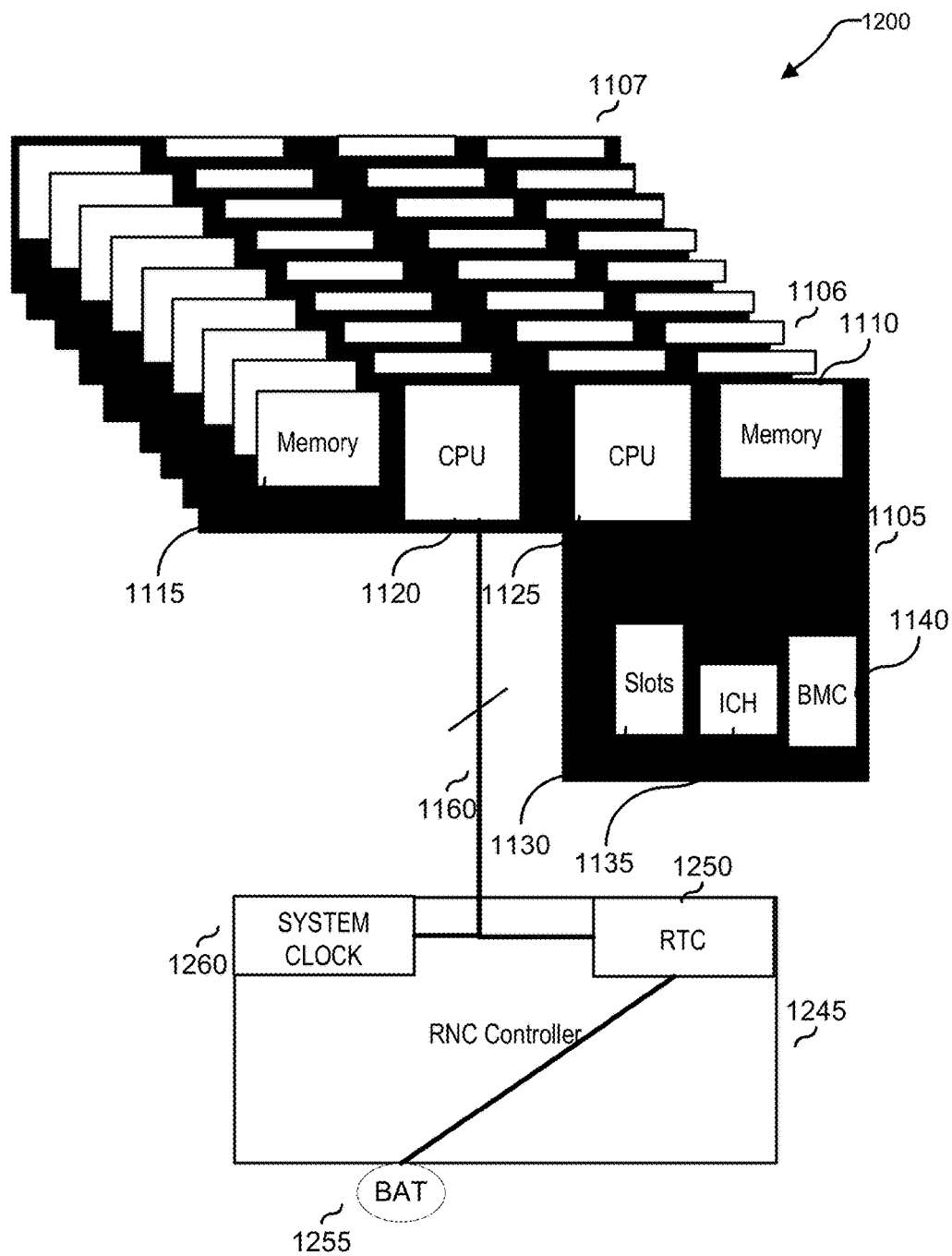

FIG. 12 shows a processing system 1200 that includes processing nodes 1105, 1106, and 1107 and RNC controller 1245. Processing nodes 1105, 1106 and 1107 include memories 1110 and 1115, CPUs 1120 and 1125, slots 1130, I/O control hubs (ICH) 1135, and baseboard management controllers 1140. Processing nodes 1105, 1106 and 1107 and their components are the same elements as in FIG. 11. Processing nodes 1105, 1106 and 1107 are connected to RNC controller 1145 through PCIe link 1160. RNC controller 1245 may correspond to RNC controller 170 of FIG. 1 and may be a component of an input/output complex switch such as input/output complex switch 110 of FIG. 1. RNC controller 1145 contains real-time clock (RTC) 1250, batteries 1255, and system clock 1260. RTC 1250 tracks clock time—seconds, minutes, hours, day, month, year, and other time measurements commonly used by humans. Battery 1255 enables RTC 1250 to continue operations even when power is not applied to RNC controller 1245.

In FIG. 12, the processing nodes of processing system 1200 may obtain real-time clock time information from RTC 1250 over PCIe link 1160. At startup, the processing nodes of processing system 1200 may execute instructions contained in BIOS. In some embodiments, as in the embodiments of FIG. 11, the processing nodes of processing system 1200 may locate the BIOS code over PCIe links. The execution of those BIOS instructions may cause the processing nodes of processing system 1200 to send a command to RTC 1250 over PCIe links 1160 to obtain the time. In response, the accessed RTC 1250 may send the real-time over PCIe link 1160es to the processing nodes of processing system 1200. The server may read this central RTC function and then load it into the local CPU/Chipset registers for an operating system and applications to later use as the current time of day, day, month, and year. In some embodiments, the chipset components may then take over keeping the time function when power is applied to the processing nodes.

In many embodiments, the processing nodes of processing system 1200 may request real time from RTC 1250 only at start-up. Afterwards, they may calculate the real time from the initial time and their own clock cycles. In other embodiments, the processing nodes of processing system 1200 may access RTC 1250 at times other than start-up. They may, for example, calculate the real time but make occasional checks to verify that their calculations do not diverge too far from the actual real time.

Some embodiments of the system of FIG. 12 may provide a uniform real clock time for all of the processing nodes in a server rack, may save on real estate of the processing nodes, and may save on component costs. The processing nodes of processing system 1200 may have a uniform clock time, because they may all obtain the clock time from the same real time clock, rather than obtaining the time from different real-time clocks. Additionally, IT only has one (or two, in the case of backup) locations to manage and update RTC information for an entire rack of servers.

Further, the cost of components is lessened. Rather than each node of the processing nodes of processing system 1200 having its own real time clock and battery, only two clocks and batteries are needed for the entire rack in the embodiment of FIG. 12. In FIG. 12, one clock, RTC 1250, supplies the real time to all of the processing nodes of processing system 1200. By doing this, a rack may eliminate the need to have a back up battery per server, thus saving cost, real-estate, and an IT component that may need servicing. It may also provide for automatic backup, since each node of a rack may be connected a secondary RNC controller for backup, as in the example of FIG. 18, below.

Many embodiments of FIG. 12 may also reliably provide real-time clock information to the processing nodes of processing system 1200, even though there is not a real-time clock on each server. Since RNC controllers are critical components of the systems, the systems may rely on their operation to provide real-time clock information.

Similarly to the operation of RTC 1250, system clock 1260 may provide a common system clock to processing nodes 1105, 1106, and 1107 of system 1200 by sending a periodic pulse to the nodes. In some embodiments, system clock 1260 may be based upon a crystal vibrating at a frequency of 32 kHz and may send pulses at that frequency. Processing nodes 1105, 1106, and 1107 may use the frequency to time bus transactions, such as the transactions over the PCIe links of system 100 of FIG. 1. As a result of using a common system clock, in some embodiments, the bus transactions may be automatically synchronized. In further embodiments, processing nodes 1105, 1106, and 1107 may apply a multiplier to the pulses sent by system clock 1260 to generate internal pulses for controlling computer cycles.

As with the real-time clock, the use of a common system clock may save cost, real-estate, and additional servicing of an IT component and may provide backup from a secondary RNC controller. Because the number of clocks needed is greatly reduced, highly precise clocks can be purchased by IT management. Further, the synchronization may be especially important for real-time applications. In particular, it may prove important in audio/video services and may also greatly simplify VM passing. In real-time systems, the different components may provide buffering to compensate for the tolerances in the timing of transactions. For example, PCI Express has a 300 ppm clock tolerance, Ethernet has a 100 ppm clock tolerance and SONET/SDH has a 20 ppm clock tolerance. Systems designed to handle time-aware or time-sensitive data may compensate for these timing differences and clock tolerance discrepancies. The compensation usually results in additional buffering which adds to latency, cost and power. In embodiments of system 1200, however, the use of a single system clock for the processing nodes may provide for automatic synchronization. The nodes all derive their clock time from the same source, and thus may keep clock times that are very close to each other. As a result, it may be unnecessary for the nodes to compensate for timing differences.

Figure 13:
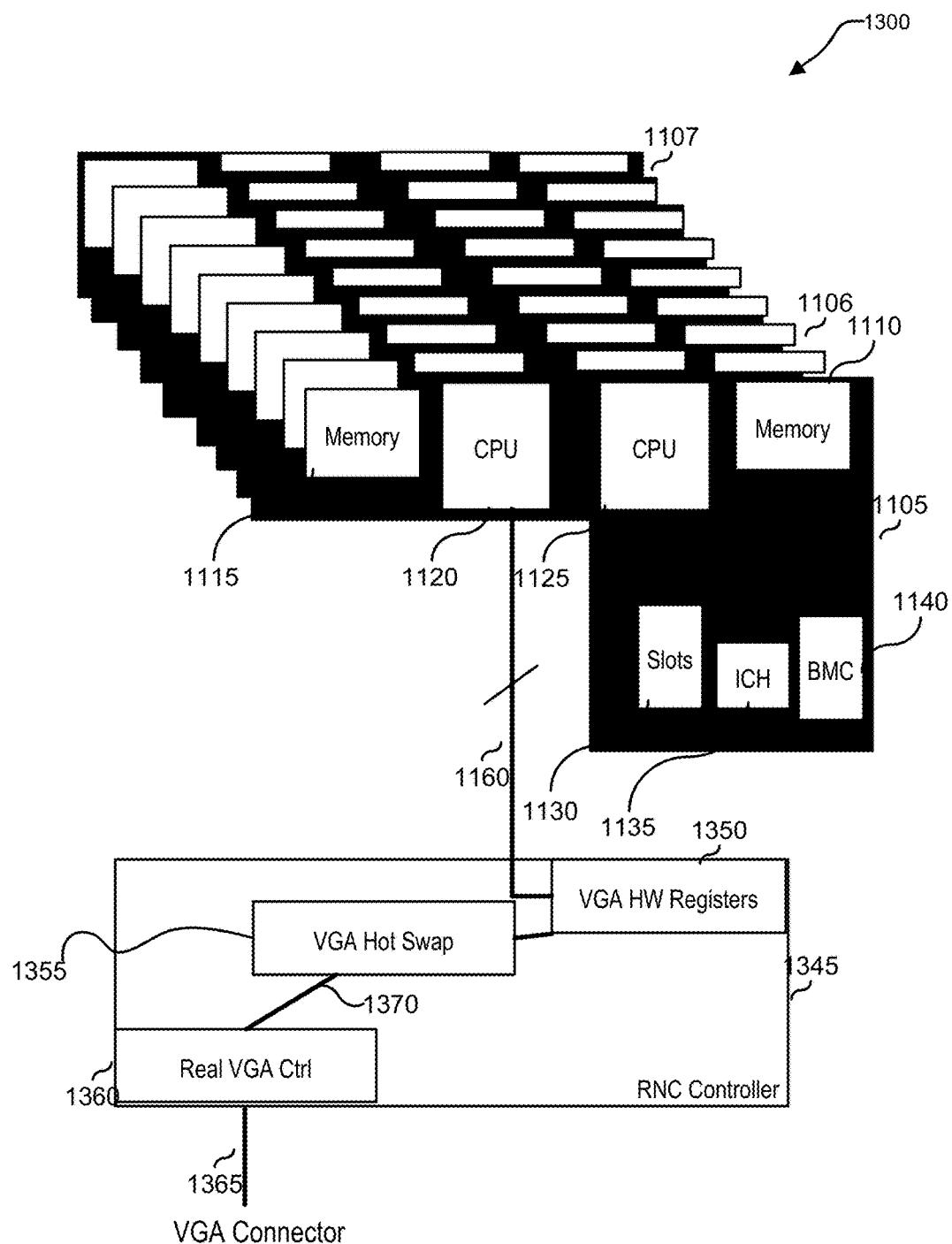

FIG. 13 shows a processing system 1300 which includes processing nodes 1105, 1106, and 1107 and RNC controller 1345. Processing nodes 1105, 1106 and 1107 include memories 1110 and 1115, CPUs 1120 and 1125, slots 1130, input/output control hubs (ICH) 1135, and baseboard management controllers 1140. Processing nodes 1105, 1106 and 1107 and their components are the same elements as in FIGS. 11 and 12. Processing nodes 1105, 1106 and 1107 are connected to RNC controller 1345 through PCIe link 1160. RNC controller 1345 may correspond to RNC controller 170 of FIG. 1 and may be a component of an input/output complex switch such as input/output complex switch 110 of FIG. 1. RNC controller 1345 contains VGA HW registers 1350, VGA hot swap module 1355, and real VGA controller 1360. VGA hot swap module 1355 is connected to real VGA controller 1360 through connection 1070. Real VGA controller 1360 is connected to VGA connector 1365.

Some embodiments of FIG. 13 may provide for rack level shared video for the processing nodes of processing system 1300. To connect one of processing nodes 1105, 1106, and 1107 to a video display, the video display may be connected to RNC controller 1345 through VGA video connectors 1365. In addition, VGA hot swap module 1355 may establish a connection between VGA HW registers 1350 and real VGA controller 1360. The establishment may involve a hot swap—the connection may be made without rebooting the node.

VGA HW registers 1350 may consist of memory that emulates registers in real VGA controller 1360. Real VGA controller 1360 may contain many registers for storing data related to the display on a video display. The registers may include pixel information and data to control the processing of the graphics information. To transmit graphics information to the video display, a node may send graphics information, such as bitmap information to VGA hardware registers 1350. From there, the information may pass to actual hardware registers on real VGA controller 1360. In some embodiments, real VGA controller 1360 may convert the string of bits it receives into electrical signals and send the electrical signals over VGA connector 1365 to the video display to control the display. Real VGA controller 1360 may include a Digital to Analog Converter (DAC) to convert the digital information held in the hardware registers into electrical signals. The video display may be used to display data generated by the operating system or by BIOS during boot. In particular, the video display may be used as a crash cart connection. In network computing, a crash cart may refer to a video screen, keyboard, and mouse on a portable cart. When a computer on a rack crashes, the crash cart may be moved to the rack and the equipment hooked up to the rack in order to display debug and error information. In some embodiments of FIG. 13, the crash cart has been rendered superfluous. To obtain that information, an administrator may simply hot swap in the node and look at the video display for the rack.

Some embodiments of FIG. 13 may also emulate video capacities to enable the proper functioning of racks. The architecture may present VGA hardware registers to a node to ensure that the operating system of the node believes it is connected to a VGA adapter, even without an actual VGA function. Such functionality may be needed during the proper operation of the rack. Windows™, in particular, may check for the presence of certain VGA hardware during OS boot. It may detect the VGA hardware registers, which imitate video adapter hardware registers, and determine that the necessary VGA hardware is present during the boot. Embodiments of FIG. 13 may also reduce the per-server costs hardware, the power costs, and the space requirements for a rack of processing nodes by eliminating redundancy. Instead of a VGA controller per node, there may be one per server rack in some embodiments. In addition, the VGA function may be centralized. In particular, if a primary input/output complex switch is not available, a node may be able to hook up to a video display or to a VGA HW register through a secondary RNC controller available as a backup through a secondary input/output complex switch, as in the example of FIG. 18, below.

In other embodiments, other graphics protocols may be used for video display, including DMI, HDMI, and DisplayPort. Video displays may include CGA, WVGA, WS VGA, HD 720, WXGA, WSXGA+, HD 1080, @K, WUXGA, XGA, SXGA, SXGA+, UXGA, QXGA, WQXGA, and QSXGA displays, or other displays known to those of skill in the art.

In other embodiments, RNC controller 1345 may also provide keyboard and mouse functionality to processing nodes 1105, 1106, and 1107. In these embodiments, RNC controller 1345 may transmit emulated mouse and keyboard signals over PCIe link 1160 to the processing nodes 1105, 1106, and 1107. In some further embodiments, providing the keyboard and mouse functionality may require converting PCIe link signals to USB bus signals, since the use of USB buses for keyboards and mice are standard.

Figures 14A, 14B:
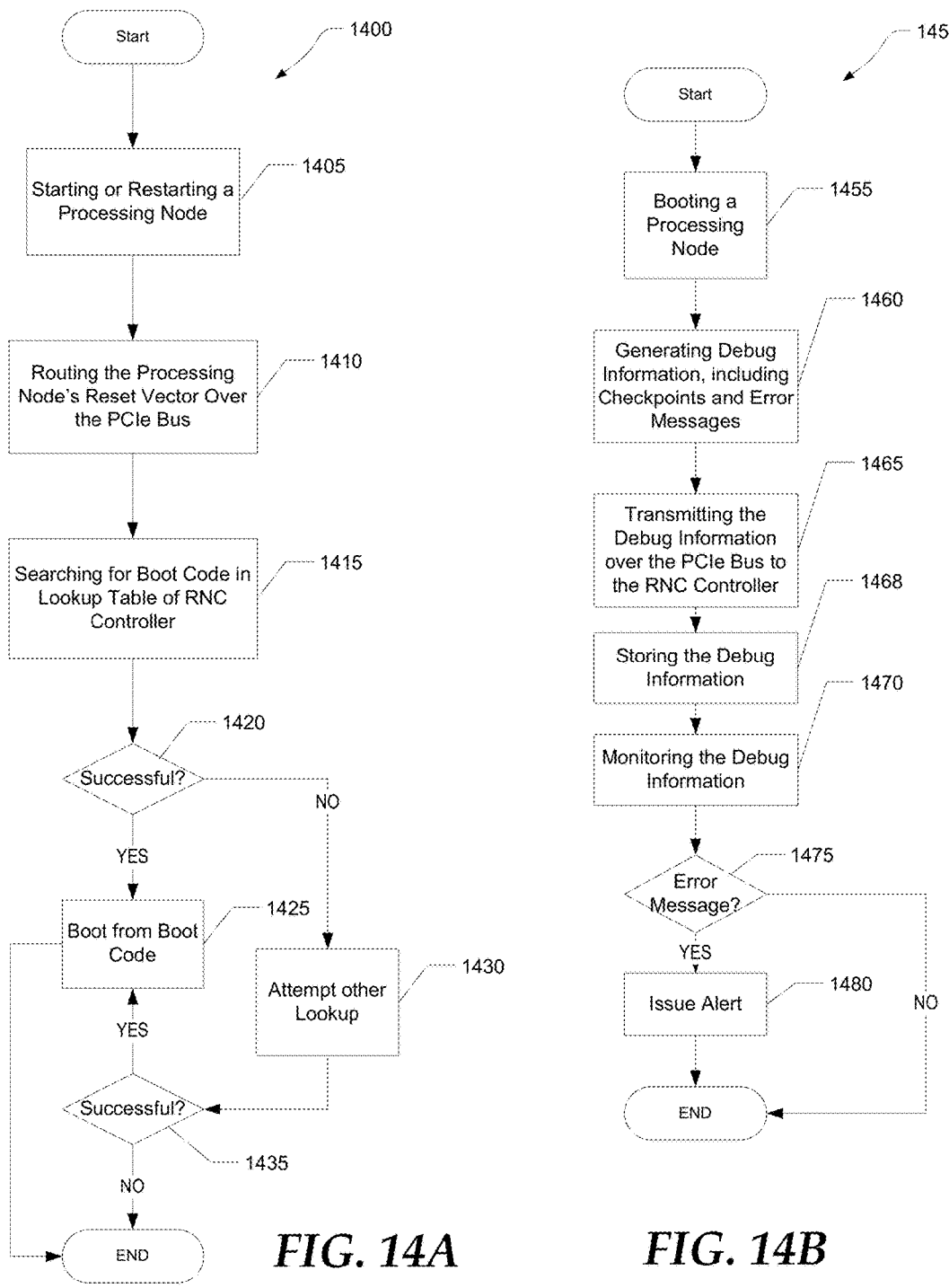
FIGS. 14A and 14B are flow diagrams illustrating a method of booting a processing node according to an embodiment of the present disclosure.

FIG. 14A shows a method 1400 of booting a processing node, such as one of the processing nodes 1105, 1106, and 1107, over a PCIe link, such as PCIe link 1160, with boot code stored on an RNC controller, such as RNC controller 1145. Method 1400 begins with starting or restarting a processing node at block 1405. Method 1400 includes routing the reset vector of the processing node over the PCIe link to the RNC controller, at block 1405. The routing may require initiating PCIe link for the processing node, to make communications over the PCIe link available for the processing node.

Method 1400 includes searching for boot code for the processing node in a lookup table, such as lookup table 1150, of the RNC controller, at block 1415. In some embodiments, the processing node may embed an identifier in the PCIe packet sent over the PCIe link 1160 to fetch the boot code. The identifier may describe the device ID of the processing node, the hardware revision, information about software such as an operating system running on the processing node, and other information about the processing node. The lookup table may index, or otherwise associate, boot code with identifiers of processing nodes.

Method 1400 includes testing whether the lookup is successful at block 1415. If so, at block 1425, the boot code is sent over the PCIe link to the processing node and it boots from the boot code. If not, at block 1430, the RNC controller attempts another lookup of suitable boot code. In some embodiments, the RNC controller may search for a suitable boot image in an internal location maintained by IT management. If that search also proved unsuccessful, the RNC controller might support a phone home capability. Method 1400 includes testing whether the other lookup is successful at block 1435. If so, at block 1425, the boot code is sent over the PCIe link to the processing node and it boots from the boot code. If not, the method ends.

FIG. 14B shows a method 1450 of providing rack level port debug centralization in PCIe memory space. Method 1450 begins at block 1455 with booting a processing node, such as one of the processing nodes 1105, 1106, and 1107. Method 1450 includes generating debug information, including checkpoints and error messages at block 1460. Method 1450 includes transmitting the debug information over the PCIe link to a RNC controller, such as RNC controller 1145, at block 1465. The information may include an identification of the processing node. Method 1450 includes storing the debug information at block 1468. The information may be stored in non-volatile storage accessible from the processing node, such as debug port storage 1170.

The method includes monitoring the debug information at block 1470. In some embodiments, the debug information may be automatically monitored, as by IT alert module 1165. The debug information is checked for error messages, at block 1475. If no messages are found, method 1450 may end. If messages are found, at block 1480, an alert module may issue an alert.

Figure 15:
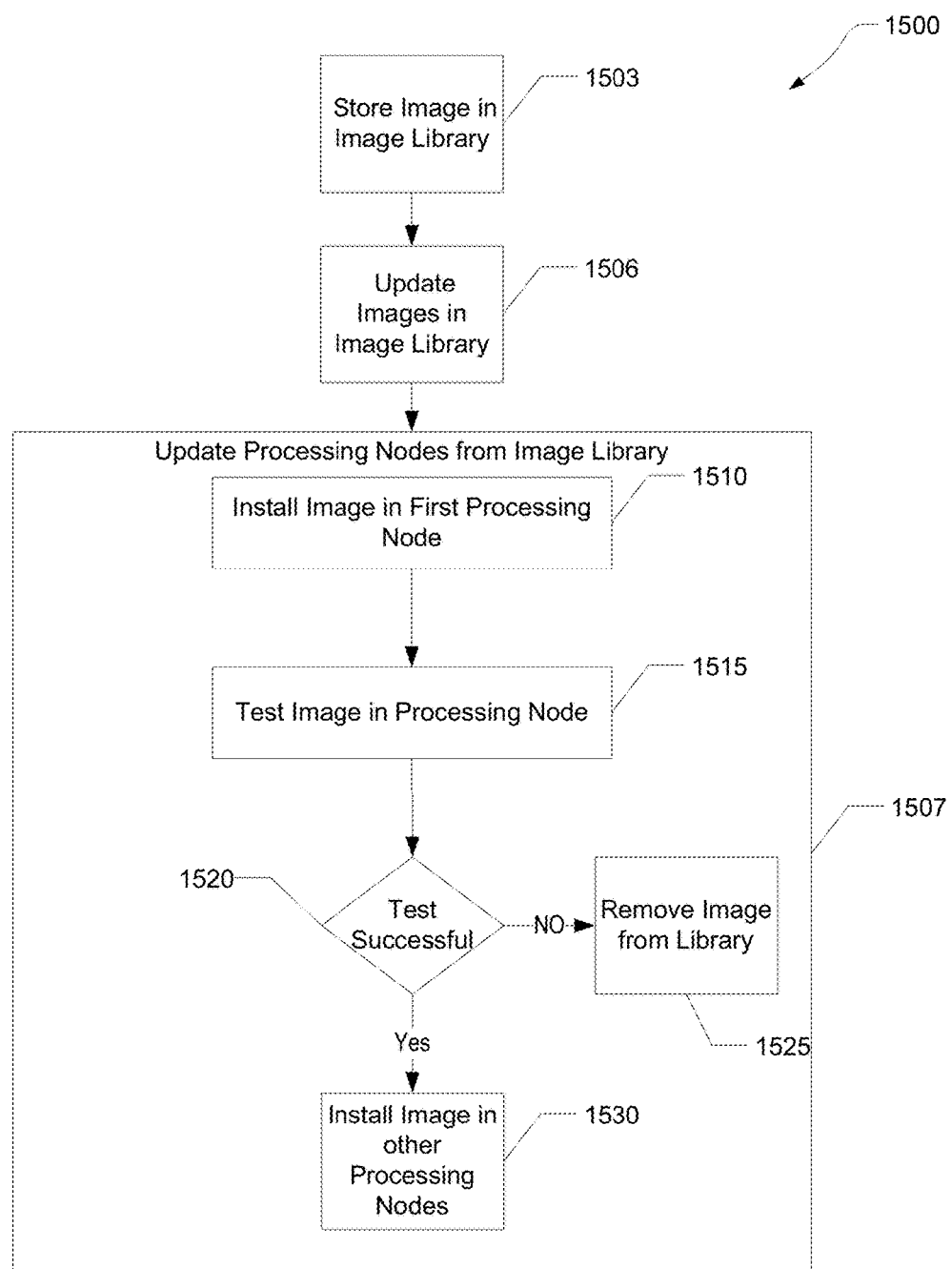
FIG. 15 is a flow diagram illustrating a method of administering an image library according to an embodiment of the present disclosure.

FIG. 15 shows a method 1500 of administering an image library, such as image library 1190 for the processing nodes of a server system, such as processing nodes 1105, 1106, and 1107. Method 1500 begins at block 1503 with storing images in the image library. Method 1500 includes updating the images in the image library at block 1506. The updating may include adding, removing, and replacing images. Method 1500 includes updating processing nodes from the image library at block 1507. Block 1507 contains several steps. At block 1510, an image may be installed in a first node. A user, such as an IT management technician, may select the image for one processing node and reboot the processing node. The image may be a new image recently added to the image library. At block 1515, the image is tested in the node. Block 1507 includes checking whether the test was successful, at block 1520. If so, at block 1530, the images may be installed in the other processing nodes. They may be marked to use the new image upon next reboot, or they may be scheduled for reboot to enable them to load the new image from the image library. If the test was not successful, the image may be removed from the library at block 1525.

Figures 16A, 16B:
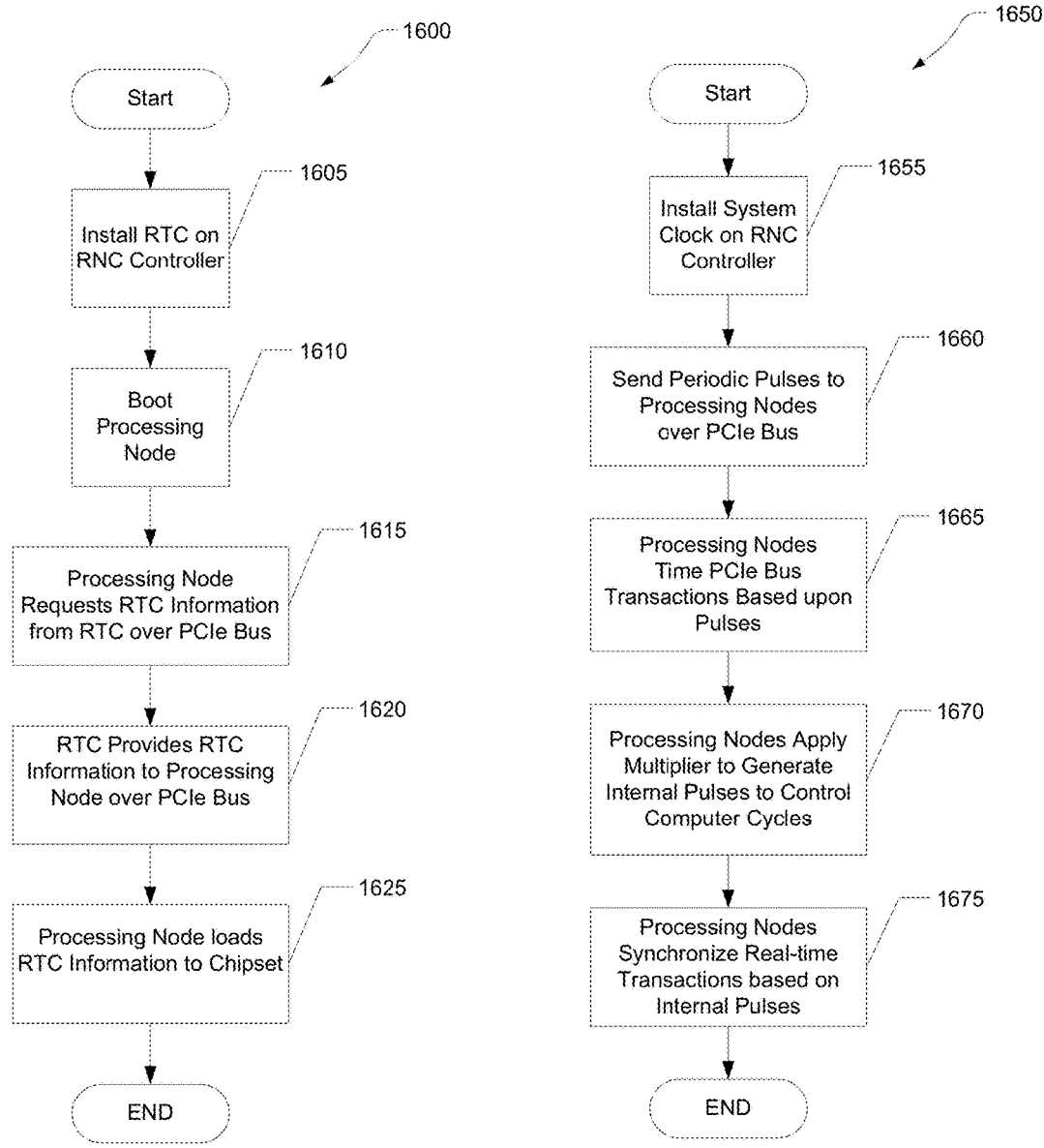
FIGS. 16A and 16B are flow diagrams illustrating a method of providing real-time clock time information from a real-time clock (RTC) according to an embodiment of the present disclosure.

FIG. 16A shows a method 1600 of providing real-time clock time information from a real-time clock (RTC), such as RTC 1250, over a PCIe link, such as PCIe link 1160. Method 1600 begins at block 1605 with installing an RTC on an RNC controller. Method 1600 includes booting a processing node at block 1610. As part of booting, the processing node may request RTC information from the RTC over the PCIe link, at block 1615. In response to the request, the RTC provides the RTC information to the processing node over the PCIe link, at block 1620. Method 1600 includes the processing node loading the RTC information into the local CPU/Chipset registers, at block 1625. In some embodiments, an operating system and applications may later use the stored information as the current time of day, day, month, and year.

FIG. 16B shows a method 1650 of providing system clock information, such as system clock information 1260, to processing nodes, such as processing nodes 1105, 1106, and 1107, of a processing system, such as system 1200, over a PCIe link, such as PCIe link 1160. Method 1650 begins with installing a system clock on an RNC controller, such as RNC controller 1245. Method 1650 includes sending periodic pulse to the processing node over the PCIe link at block 1660. In some embodiments, the pulses may be based upon a crystal vibrating at a frequency of 32 kHz and may be sent at that frequency. Method 1650 includes the processing nodes using the pulses to time PCIe link transactions, at block 1665.

Method 1650 includes the processing nodes applying a multiplier to the pulses sent by system clock to generate internal pulses to control computer cycles, at block 1670. Method 1650 includes the processing nodes applying a multiplier to the pulses sent by system clock to generate internal pulses to control computer cycles, at block 1670. Method 1650 ends at block 1675 with the processing nodes synchronizing Real-Time transactions based on the internal pulses.

Figures 17A, 17B:
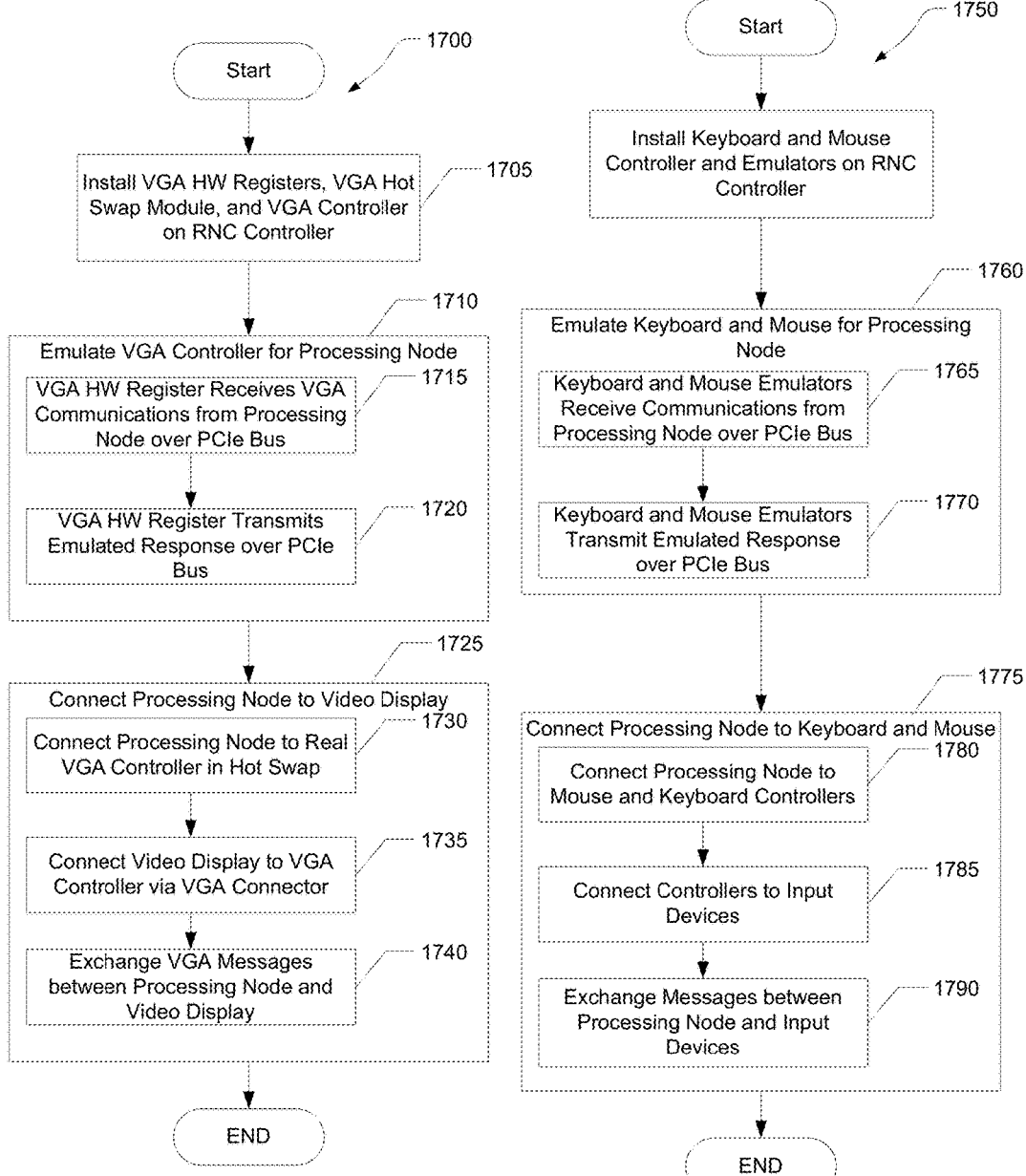
FIGS. 17A and 17B are flow diagrams illustrating a method of providing for rack level shared video according to an embodiment of the present disclosure.

FIG. 17A shows a method 1700 of providing for rack level shared video for the processing nodes of a processing system. Method 1700 may be implemented in a system such as processing system 1300. Method 1700 begins at block 1705 with installing VGA hardware registers, such as a VGA hardware registers 1350, a VGA hot swap module, such as VGA hot swap module 1355, and a VGA controller, such as real VGA controller 1360, on an RNC controller, such as RNC controller 1345.

Method 1700 includes emulating a VGA controller for the processing nodes at block 1710. Block 1710 includes the VGA hardware registers receiving VGA communications from processing nodes over the PCIe link at block 1715. Some operating systems may, for example, check for the presence of a VGA adapter during boot. Block 1710 includes the VGA hardware registers transmitting responses over the PCIe link at block 1720.

Method 1700 includes connecting a processing node to a video display at block 1725. Block 1725 includes connecting the processing node to the real VGA controller in a hot swap through the actions of the VGA hot swap module at block 1730. Block 1725 includes connecting the VGA controller to the video display at block 1735. Block 1725 includes exchanging VGA messages between the processing node and the video display at block 1740. In some embodiments, for example, the processing node may send pixel information about the images to be displayed and the video display may respond with status reports.

FIG. 17B shows a method 1700 of providing for rack level shared keyboard and mouse for the processing nodes of a processing system. Method 1750 may be implemented in a system such as processing system 1300. Method 1750 begins at block 1755 with installing keyboard and mouse controllers and emulators on an RNC controller, such as RNC controller 1345.

Method 1750 includes emulating a keyboard and mouse for the processing nodes at block 1760. Block 1760 includes the keyboard and mouse emulators receiving communications from the processing nodes over the PCIe link at block 1765. Block 1710 includes the keyboard and mouse emulators transmitting the emulated responses over the PCIe link at block 1770.

Method 1750 includes connecting a processing node to a keyboard and mouse at block 1775. Block 1775 includes connecting the processing node to the keyboard and mouse controllers at block 1780. Block 1775 includes connecting the keyboard and mouse controllers to the keyboard and mouse, respectively at block 1785. Block 1725 includes exchanging messages between the processing node and the keyboard and mouse at block 1790. In some embodiments, for example, the mouse may send information about its state—which button is clicked—and its position. The keyboard may send information about a depressed key or combination of keys and about the timing of the keystrokes. In response, the processing node may send status information. In other embodiments, other input devices may be used instead of, or in addition to, a mouse and a keyboard.

Figure 18:
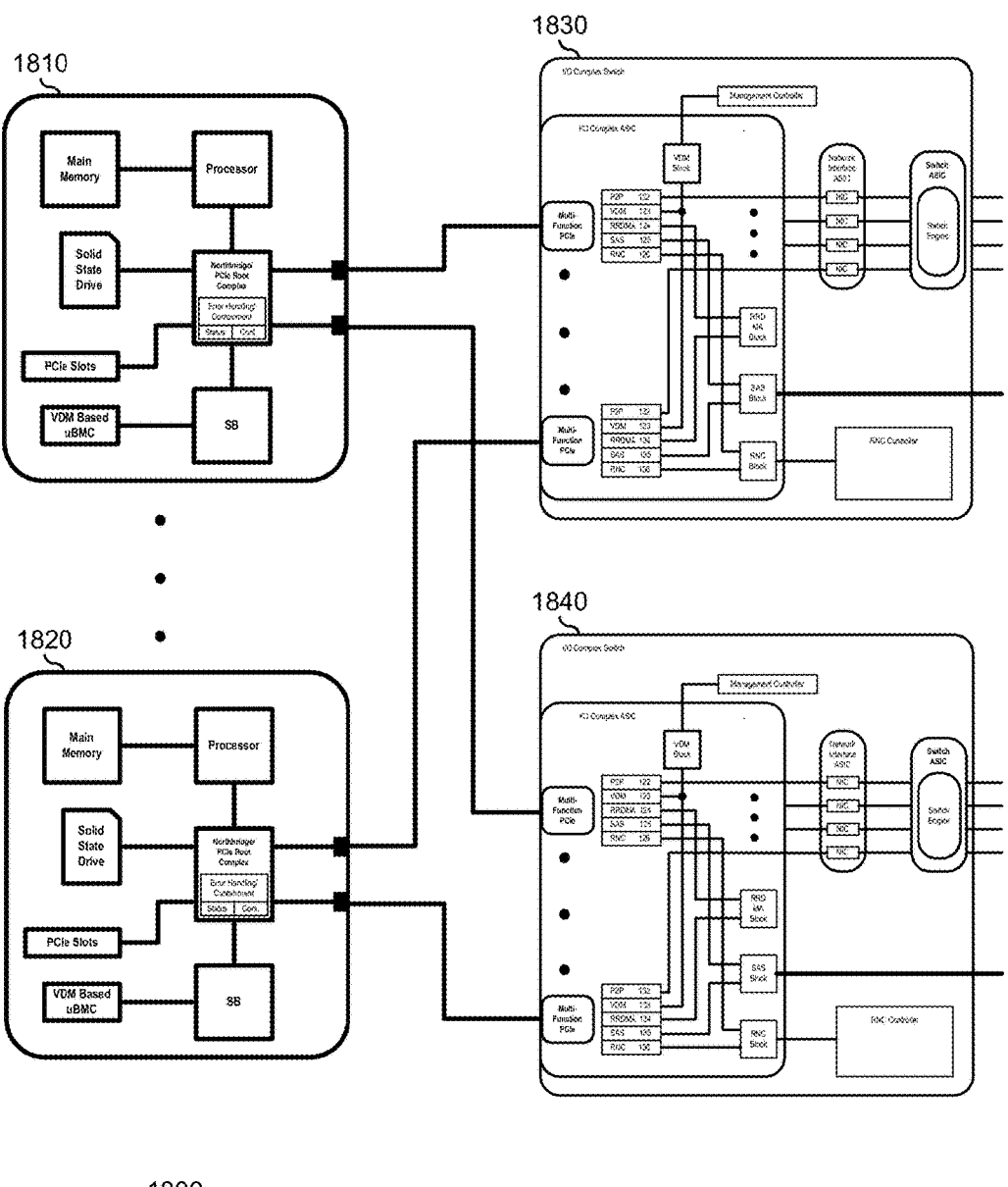
FIG. 18 is a block diagram illustrating a processing system according to another embodiment of the present disclosure.

FIG. 18 illustrates a processing system 1800 including a processing node 1810 similar to processing node 200, one or more additional processing nodes 1820, and input/output complex switches 1830 and 1840. Processing nodes 1810 and 1820 each include a pair of external PCIe interfaces. Processing system 1800 provides a redundant, high-availability processing system where each processing node 1810 and 1820 is connected to two input/output complex switches 1830 and 1840. As such, processing node 1810 is connected via the first PCIe interface to a first multi-function PCIe module of input/output complex switch 1830, and via the second PCIe interface to a first multi-function PCIe module of input/output complex switch 1840. Processing node 1820 is connected via the first PCIe interface to a second multi-function PCIe module of input/output complex switch 1830, and via the second PCIe interface to a second multi-function PCIe module of input/output complex switch 1840. In a particular embodiment, the northbridges of processing nodes 1810 and 1820 are configured to provide mirrored functionality on each of input/output complex switches 1830 and 1840. In another embodiment, the northbridges of processing nodes 1810 and 1820 are configured such that one of input/output complex switches 1830 and 1840 is a primary input/output complex switch, and the other is a secondary input/output complex switch.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (input/output) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An input/output (I/O) device that provides congestion management for processing nodes, the I/O device comprising:
    a management controller interface to provide managed services for a plurality of processing nodes coupled to the I/O device;
    a plurality of network switching interfaces to provide network accessibility for the processing nodes;
    a storage interface to provide data storage for the processing nodes;
    a component controller interface to provide legacy functionality for the processing nodes; and
    a plurality of Peripheral Component Interconnect Express (PCIe) multifunction modules, wherein the multifunction modules are enumerated as a PCIe multifunction device of a particular bus in a PCIe configuration space of an associated processing node, wherein the multifunction modules include:
        a processing node interface including a PCIe interface enumerated in the PCIe configuration space as the particular bus and that provides a single I/O access point for the associated processing node;
        a first PCIe endpoint enumerated in the configuration space as a first PCIe function number of the PCIe multifunction device and coupled to the management controller interface, such that the management controller interface provides managed services for the associated processing node;
        a second PCIe endpoint enumerated in the PCIe configuration space as a second PCIe function number of the PCIe multifunction device and coupled to one of the plurality of network switching interfaces, such that the one network switch into provides network accessibility to the associated processing node;
        a third PCIe endpoint enumerated in the PCIe configuration space as a third PCIe function number of the PCIe multifunction device and coupled to a remote direct memory access (RDMA) block, such that the RDMA block provides node-to-node accessibility to the associated processing node;

a fourth PCIe endpoint enumerated in the PCIe configuration space as a fourth PCIe function number of the PCIe multifunction device and coupled to the storage interface, such that the storage interface provides a storage capability for the associated processing node; and a fifth PCIe endpoint enumerated in the PCIe configuration space as a fifth PCIe function number of the PCIe multifunction device and coupled to the component controller interface, such that the component controller interface provides a legacy functionality for the associated processing node.

2. The I/O device of claim 1, wherein the management controller interface includes an Intelligent Platform Management Interface, and is coupled to a management controller that operates to provide managed services for a first processing node coupled to a first processing node interface of a first multifunction module.

3. The I/O device of claim 2, wherein a first network switching interface of the plurality of network switching interfaces is coupled to a network interface controller that operates to provide network connectivity for the first processing node.

4. The I/O device of claim 2, wherein the storage interface operates to provide data storage for the first processing node.

5. The I/O device of claim 4, wherein the storage interface comprises at least one of a Serial Attach SCSI (SAS) interface and a Serial ATA (SATA) interface.

6. The I/O device of claim 2, wherein the component controller interface is coupled to a component controller that operates to provide a set of legacy functions for the first processing node.

7. The I/O device of claim 6, wherein the set of legacy functions includes:
a basic input/output system (BIOS) for the processing node;
a real time clock for the processing node;
a keyboard/video/mouse interface for the processing node; and
a debug port for the processing node.

8. The I/O device of claim 1, further comprising the RDMA block.

9. A network switching device that provides congestion management for processing nodes, the network switching device comprising:
a first Peripheral Component Interconnect Express (PCIe) multifunction module including a first PCIe interface to a first processing node, and a first plurality of PCIe endpoints, wherein the first PCIe interface is enumerated as a first bus in a first PCIe configuration space of the first processing node, and the first PCIe multifunction module is enumerated as a first PCIe multifunction device in the first PCIe configuration space to provide a single input/output (I/O) access point for the first processing node;
a management controller coupled to a first one of the first plurality of endpoints enumerated within the first PCIe configuration space as a first PCIe endpoint number of the first PCIe interface, and operable to provide managed services to the first processing node;
a remote direct memory access (RDMA) block coupled to a second one of the first plurality of endpoints enumerated within the first PCIe configuration space as a second PCIe endpoint number of the first PCIe interface, and operable to provide direct memory access (DMA) between the first processing node coupled to a first multifunction module and a second processing node coupled to a second multifunction module;
a storage interface block coupled to a third one of the first plurality of endpoints enumerated within the first PCIe configuration space as a third PCIe endpoint number of the first PCIe interface, and operable to provide a data storage capability to the first processing node; and
a remote node component controller block coupled to a fourth one of the first plurality of endpoints enumerated within the first PCIe configuration space as a fourth PCIe endpoint number of the first PCIe interface, and operable to provide a set of legacy functions to the first processing node;
wherein a fifth one of the first plurality of endpoints enumerated within the first PCIe configuration space as a fifth PCIe endpoint number of the first PCIe interface is operable to be coupled to a first network interface for the first processing node to provide network accessibility to the first processing node.

10. The network switching device of claim 9, wherein the storage interface block comprises at least one of a Serial Attach SCSI (SAS) interface and a Serial ATA (SATA) interface.

11. The network switching device of claim 9, wherein the set of legacy functions includes:
a basic input/output system (BIOS) for the processing node;
a real time clock for the processing node;
a keyboard/video/mouse interface for the processing node; and
a debug port for the processing node.

12. The network switching device of claim 9, wherein the first network interface is coupled to a network interface controller that operates to provide network connectivity for the first processing node.

13. The network switching device of claim 9, further comprising:
a second PCIe multifunction module including a second PCIe interface to a second processing node, and a second plurality of PCIe endpoints, wherein the second PCIe interface is enumerated as a second bus in the first PCIe configuration space of the second processing node, and the second PCIe multifunction module is enumerated as a second PCIe multifunction device in the second PCIe configuration space;
wherein:
the management controller is coupled to a first one of the second plurality of endpoints enumerated within the second PCIe configuration space as a first PCIe endpoint number of the second PCIe interface, and is operable to provide managed services to the second processing node;
the RDMA block is coupled to a second one of the second plurality of endpoints enumerated within the second PCIe configuration space as a second PCIe endpoint number of the second PCIe interface, and is operable to provide DMA between the second processing node and the first processing node;
the storage interface block is coupled to a third one of the second plurality of endpoints enumerated within the second PCIe configuration space as a third PCIe endpoint number of the second PCIe interface, and is operable to provide the data storage capability to the second processing node; and the remote node component controller block is coupled to a fourth one of the second plurality of endpoints enumerated within the second PCIe configuration space as a fourth PCIe endpoint number of the second PCIe interface, and is operable to provide the set of legacy functions to the second processing node; and a fifth one of the second plurality of endpoints enumerated within the second PCIe configuration space as a fifth PCIe endpoint number of the second PCIe interface is operable to be coupled to a second network interface for the second processing node to provide network accessibility to the second processing node.

14. A network switching device that provides congestion management for processing nodes, the network switching device comprising:

a plurality of Peripheral Component Interconnect Express (PCIe) multifunction modules, the multifunction modules each including:
 a PCIe interface to a processing node enumerated within a PCIe configuration space as a particular bus to provide a single input/output (I/O) access point for the processing node; and
 a PCIe first endpoint enumerated within the PCIe configuration space as a first device of the particular bus; and a remote node component controller coupled to each of the first PCIe endpoints, and operable to provide a set of legacy functions to a first processing node coupled to a first PCIe interface of a first multifunction module of the plurality of multifunction modules, each function enumerated within the PCIe configuration space as a different function number.

15. The network switching device of claim 14, wherein the set of legacy functions provide:
 a real time clock component for the first processing node;
 basic input/output system code for the first processing node;
 a timing module for the first processing node;
 a first communication module to receive debug information from the first processing node and to transmit the alerts to the first processing node; and
 a second communication module to provide a video controller emulator for the first processing node.

16. The network switching device of claim 14, wherein:
 the respective interfaces each comprise Peripheral Component Interconnect Express (PCIe) interfaces; and
 the respective endpoints each comprise PCIe endpoints.

17. The network switching device of claim 14, wherein the remote node component controller is further operable to provide the set of legacy functions to a second processing node coupled to a second interface of a second multifunction module of the plurality of multifunction modules.

18. The network switching device of claim 9, wherein the management controller interface includes an Intelligent Platform Management Interface, and is coupled to a management controller that operates to provide managed services for a processing node coupled to the processing node interface of a particular multifunction module.

* * * * *